United States Patent [19]

Utagawa

[11] Patent Number: 4,564,919

[45] Date of Patent: Jan. 14, 1986

[54] CORRELATION CALCULATING APPARATUS

[75] Inventor: Ken Utagawa, Tokyo, Japan

[73] Assignee: Nippon Kogaku K.K., Tokyo, Japan

[21] Appl. No.: 450,785

[22] Filed: Dec. 17, 1982

[30] Foreign Application Priority Data

| Dec. 22, 1981 | [JP] | Japan | 56-206092 |
| Dec. 26, 1981 | [JP] | Japan | 56-209552 |
| Feb. 27, 1982 | [JP] | Japan | 57-31329 |
| Apr. 17, 1982 | [JP] | Japan | 57-63231 |

[51] Int. Cl.⁴ ............................................ G06F 15/336
[52] U.S. Cl. ................................................... 364/728
[58] Field of Search ............................ 364/728, 561

[56] References Cited

U.S. PATENT DOCUMENTS

| 3,351,943 | 11/1967 | Bush et al. | 364/728 |
| 3,598,979 | 8/1971 | Moreau | 364/728 |
| 4,071,903 | 1/1978 | Head et al. | 364/728 |
| 4,078,171 | 4/1978 | Stauffer | 250/201 |
| 4,097,801 | 6/1978 | Freeman et al. | 364/728 |
| 4,162,474 | 7/1979 | Broder et al. | 364/728 |
| 4,185,191 | 1/1980 | Stauffer | 250/204 |
| 4,224,679 | 9/1980 | Nossen et al. | 364/728 |
| 4,319,334 | 3/1982 | Gurry | 364/728 |
| 4,347,580 | 8/1982 | Bond | 364/728 |
| 4,370,724 | 1/1983 | Herbst et al. | 364/561 |

*Primary Examiner*—David H. Malzahn
*Attorney, Agent, or Firm*—Shapiro and Shapiro

[57] ABSTRACT

An apparatus for calculating correlation between first and second sets of data which are respectively composed of plural data includes a first transfer apparatus, a second transfer apparatus, and an apparatus for calculating absolute value. The first transfer apparatus comprises at least first and second transfer stages and is adapted to transfer the first set of data in succession from the first transfer stage to the second transfer stage, and the second transfer apparatus comprises at least first and second transfer stages and is adapted to transfer the second set of data in succession from the second transfer stage to the first transfer stage in synchronization with the data transfer by the first transfer apparatus. The absolute value to be calculated is that of the difference between the data in the first transfer stage of the first transfer apparatus and the data in the first transfer stage of the second transfer apparatus in synchronization with the data transfer by the first and second transfer apparatuses.

12 Claims, 44 Drawing Figures

FIG. 9
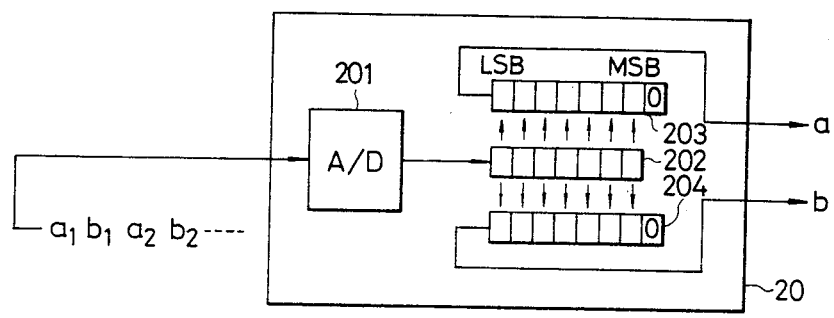
FIG. 10
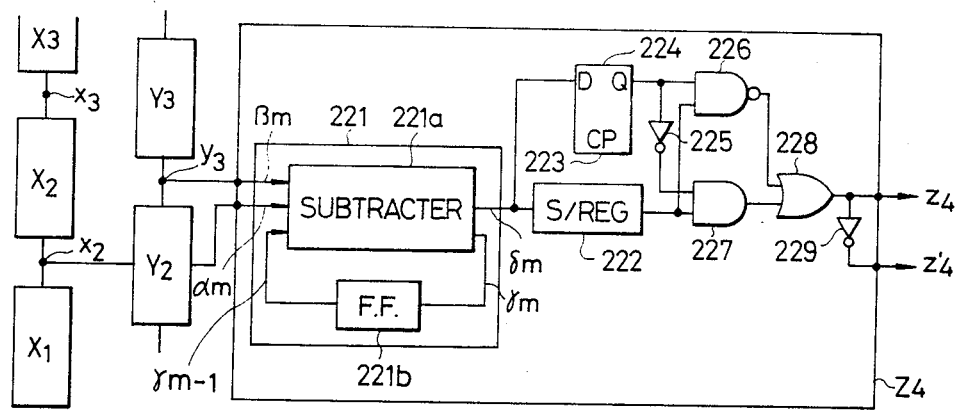
FIG. 11
| αm | βm | γm-1 | δm | γm |
|----|----|------|----|----|
| 1  | 1  | 0    | 0  | 0  |
| 0  | 1  | 0    | 1  | 1  |
| 1  | 0  | 0    | 1  | 0  |
| 0  | 0  | 0    | 0  | 0  |
| 1  | 1  | 1    | 1  | 1  |
| 0  | 1  | 1    | 0  | 1  |
| 1  | 0  | 1    | 0  | 0  |
| 0  | 0  | 1    | 1  | 1  |

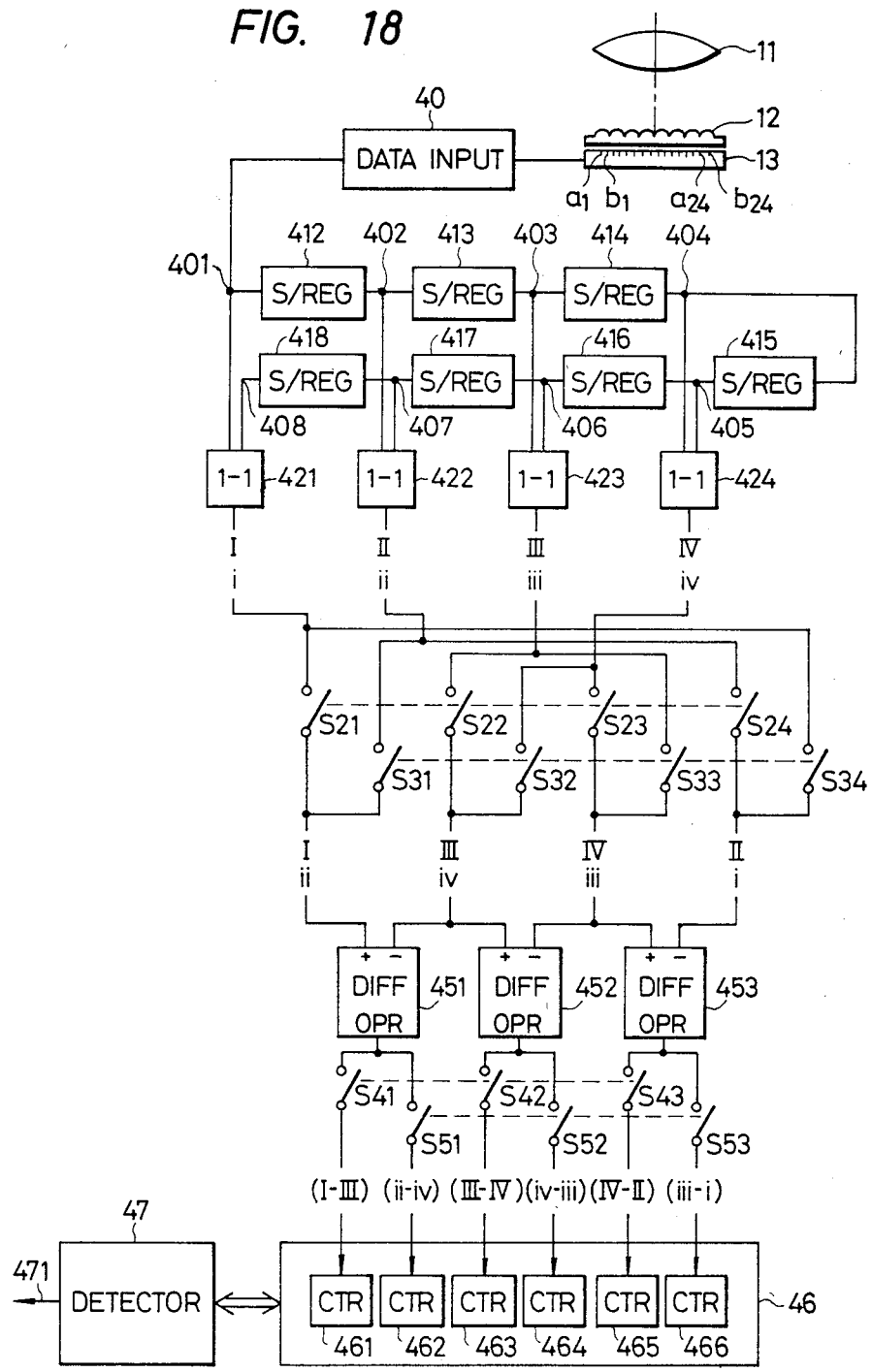

| J | | | | | | DECISION |
|---|---|---|---|---|---|---|
| 1 | 2 | 3 | 4 | 5 | 6 | |
| 0 | 0 | 0 | 0 | 0 | 0 | FRONT FOCUS |
| 0 | 0 | 0 | 0 | 0 | 1 | $J^i = 5$ |
| 0 | 0 | 0 | 0 | 1 | 1 | $J^i = 4$ |
| 0 | 0 | 0 | 1 | 1 | 1 | $J^i = 3$ |
| 0 | 0 | 1 | 1 | 1 | 1 | $J^i = 2$ |
| 0 | 1 | 1 | 1 | 1 | 1 | $J^i = 1$ |
| 1 | 1 | 1 | 1 | 1 | 1 | REAR FOCUS |
| OTHERWISE | | | | | | OUT OF CORRELATION |

| COUNT NUMBER | D (MSB) | C | B | A (LSB) |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

CORRELATION CALCULATING APPARATUS

BACKGROUND OF THE INVENTION

1. Field of the Invention

The present invention relates to an apparatus for calculating the correlation between two sets of data, and more particularly to such an apparatus for calculation of correlation, for example, after photoelectric conversion in optical range finding with two photoelectric converting element arrays.

2. Description of the Prior Art

U.S. Pat. No. 4,078,171 discloses an apparatus for detecting the state of focusing from the correlation between two sets of photoelectric output signals obtained from a spatial image. Also U.S. Pat. No. 4,185,191 discloses a focus detecting apparatus adapted for use in a camera of the through-the-lens system.

In such prior art, two sets of data a, b corresponding to photoelectric output signals are obtained from an array of small lenses provided in the vicinity of a focal plane of an objective lens and from a set of photoelectric converting elements provided in pairs in the vicinity of the focal point of each small lens, and the data set a is shifted in succession with respect to the data set b for determining the correlation value between said two data sets at each shifted position, whereby an amount of shift giving the strongest correlation is determined among plural correlation values. In this manner, it is possible to detect the state in which the data sets a, b provide the largest correlation.

However, such apparatus is not suitable for a case requiring high-speed calculation for a set including a large number of data, since an enlarged range of shift for investigating the correlation requires time-consuming repetitive calculations. Particularly in a photographic camera, a long calculating time leads to an insufficient response speed in photographing a fast moving object or in photographing with a motor-driven camera.

Also the conventional apparatus described above are incapable of sufficiently precise measurement due to the lack of information if the number of data compared in calculating the correlation is limited, for example equal to or less than 20. Also, even if the number of data to be compared is large, it is still not possible to detect the image displacement with such a precision as is obtained in a case where the width of each photoelectric converting element is divided into several, again because of the shortage of information, since the data processing is conducted after the photoelectric converted output signals are simply binary encoded.

SUMMARY OF THE INVENTION

An object of the present invention is to provide a correlation calculating apparatus capable of high-speed calculation.

The above-mentioned object can be achieved according to the present invention by a high-speed correlation calculating apparatus capable of completing substantially all the calculations of correlations during one transfer of two data sets by parallel calculations of correlations.

Another object of the present invention is to provide a range finding apparatus capable of parallel correlation calculations without a significant increase in the circuitry, said apparatus being capable of effecting the calculations of correlations while receiving the time-sequential signals from photoelectric converting element arrays and of completing said calculations substantially simultaneously with the completion of reception of said signals.

Still another object of the present invention is to provide a range finding apparatus capable of detecting the image displacement effectively even when the number of data to be compared is limited, and with an improved accuracy when the number of data to be compared is increased.

BRIEF DESCRIPTION OF THE DRAWINGS

FIG. 9 is a circuit diagram showing the structure of the data input part shown in FIG. 8;

FIG. 10 is a circuit diagram showing the structure of a circuit block Z4 shown in FIG. 8;

FIG. 11 is a chart showing the function of the circuit shown in FIG. 10;

FIG. 18 is a block diagram showing a modified second embodiment;

DETAILED DESCRIPTION OF THE PREFERRED EMBODIMENTS

Figure 1A:
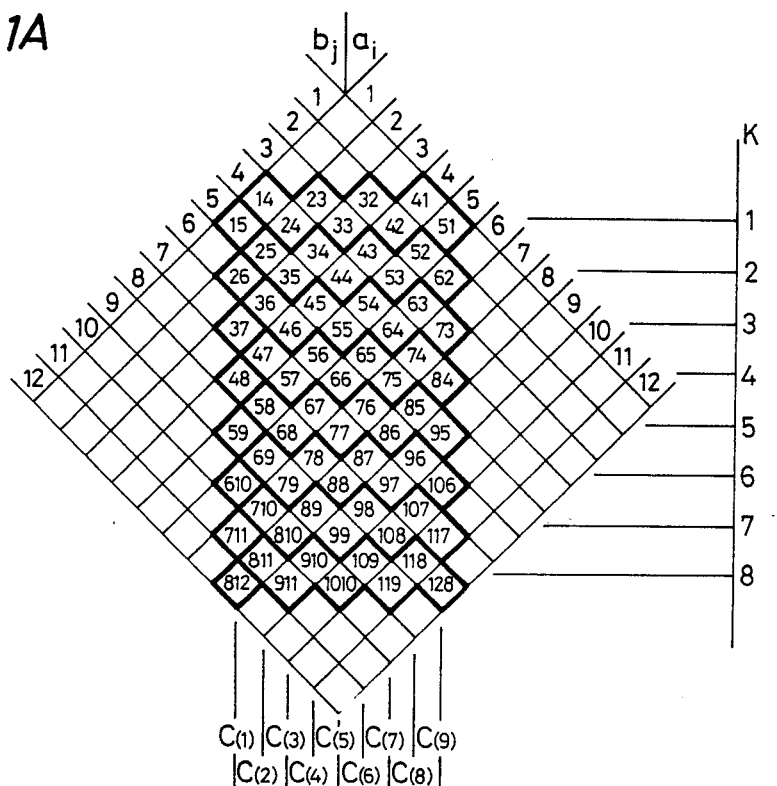
FIG. 1A is an explanatory view showing the principle of a first embodiment of the present invention.

Now reference is made to FIG. 1A for explaining the outline of basic principle of correlation calculation in the first embodiment. For the purpose of simplicity it is assumed that the number of data of each data set is 12, but in practice the number of data in each set can be arbitrarily selected. Let us consider a chart shown in FIG. 1A, in which two sets of data (a1–a12) and (b1–b12) are respectively placed along mutually orthogonal coordinates, and each correlation $c_{ij}$ of the data $a_i$ and $b_j$ is placed at a crossing point (i, j) of the matrix. There may be considered various amounts of correlation such as $c_{ij} = |a_i - b_j|^p$ or $c_{ij} = a_i b_j$, but the present embodiment adopts a correlation $c_{ij} = |a_i - b_j|$ which is easiest to calculate in digital data processing.

Figures 2, 3:
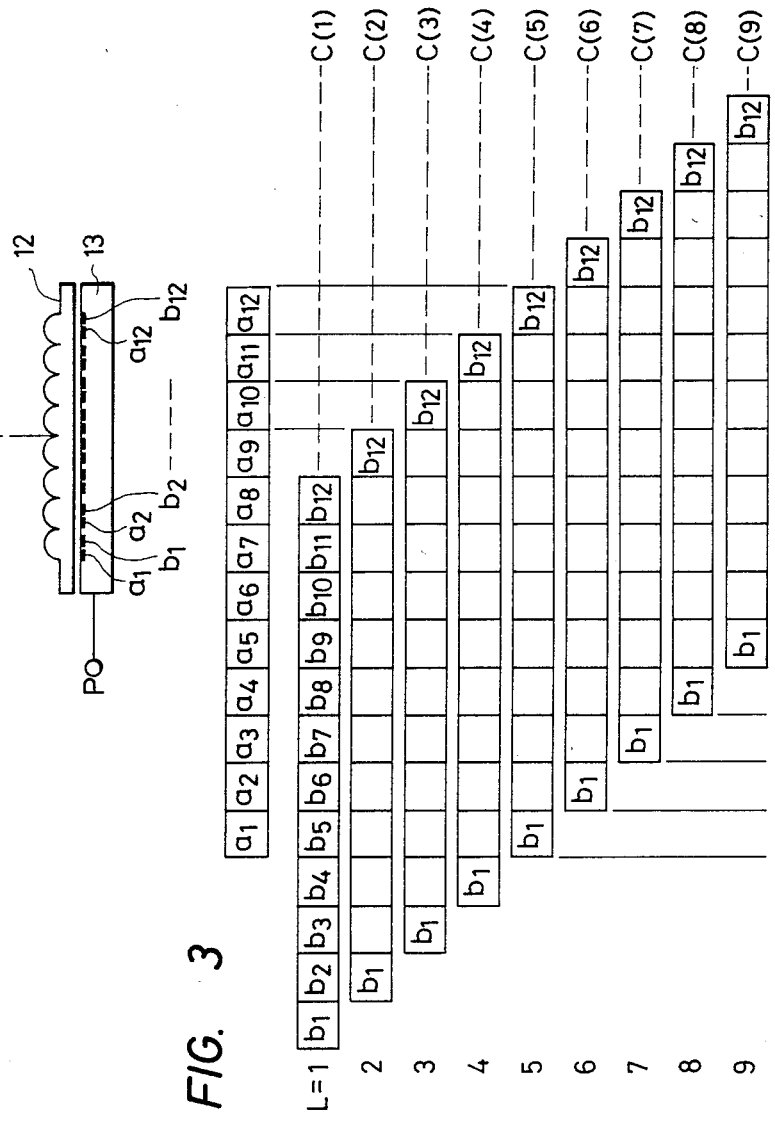
FIG. 2 is a schematic view of an optical system for obtaining photoelectric output signals.
FIG. 3 is an explanatory chart showing the procedure of correlation calculation in the prior art.

Said two sets of data a, b are obtained from an array of photoelectric converting elements 13 grouped, as shown in FIG. 2, in pairs positioned in the vicinity of respective focal points of an array 12 of small lenses provided close to the focal plane of a photographic lens 11.

In the following there will be given an explanation of the conventional calculating procedure disclosed in the aforementioned U.S. Pat. No. 4,078,171. In order to determine the correlation between two sets of data, the data set b (b1–b12) is shifted in succession in positions L=1–9 as shown in FIG. 3 with respect to the data set a (a1–a12), then the following correlations are calculated between the data a and b at each position L:

| | |
|---|---|
| C(1) | between a1–a8 and b5–b12 at position L = 0 |
| C(2) | between a1–a9 and b4–b12 at position L = 2 |
| C(3) | between a1–a10 and b3–b12 at position L = 3 |
| ... | |
| C(5) | between a1–a12 and b1–b12 at position L = 5 |
| ... | |
| C(9) | between a5–a12 and b1–b8 at position L = 9, | and an amount of shift L giving the strongest correlation C(L) is determined among C(1)–C(9). In this manner it is possible to detect a state of strongest correlation between two signal series a and b.

Figure 1B:
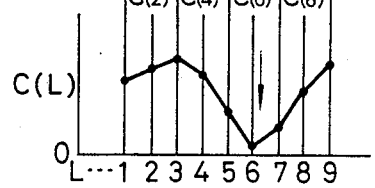
FIG. 1B is a chart showing the distribution of correlations.

Now the above-described conventional calculating procedure will be explained further in relation to the matrix shown in FIG. 1A, in which each square shows the comparing position of data $a_i$ and $b_j$. In the conventional procedure, at first the correlation at a position L=1 shown in FIG. 3 is determined by calculating correlations $c_{ij}$ by successively transferring the data in the order of K=1–8, namely $c_{1,5}$, $c_{2,6}$, $c_{3,7}$, $c_{4,8}$, $c_{5,9}$, $c_{6,10}$, $c_{7,11}$ and $c_{8,12}$, and by calculating the sum C(1) of the matrix squares 15, 26, 37, 48, 59, 610, 711 and 812. The correlations C(2)–C(9) are obtained in the same manner by repeating the identical procedure for the positions L=2–9. In this manner the data transfer of K=1–8 has to be repeated 9 times for calculating the values of C(1)–C(9). In the conventional apparatus a value of L corresponding to the strongest correlation, i.e. L=6 in the illustrated example, is determined from the values of C(L) calculated as shown in FIG. 1B.

Figure 1C:
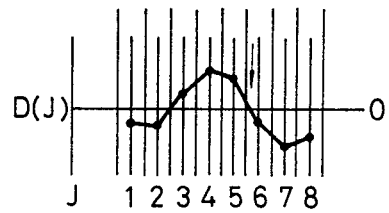
FIG. 1C is a chart showing the differentials of the correlations shown in FIG. 1B.

On the other hand, in the present embodiment, the values for L=1–9 are simultaneously calculated, in parallel manner, at the step K=1, and the correlations C(1)–C(9) are obtained by a single data transfer from K=1 to K=8 as will be explained in relation to FIG. 4. A calculating block 21, constituting an essential part of the apparatus, is composed of two shift registers X, Y and a parallel correlation calculator Z, wherein said shift registers have mutually opposite data transfer directions. More specifically the data set a (a1, a2, ..., a12) is transferred, in the stages constituting the shift register X, in the order of X5-X4-X3-X2-X1, while the data set b (b1, b2, ..., b12) is transferred, in the stages constituting the shift register Y, in the order of Y1-Y2-Y3-Y4-Y5. Said two shift registers X, Y are both controlled by a sequence control circuit 22. The transfer stages X1–X5 and Y1–Y5 of said shift registers are provided respectively with output terminals x1–x5, y1–y5 which are alternately connected to the correlation calculator Z as shown in the drawing. Said correlation calculator Z calculates $|y1-x1|$, $|x1-y2|$, $|y2-x2|$, $|x2-y3|$, $|y3-x3|$, $|x3-y4|$, $|y4-x4|$, $|x4-y5|$ and $|y5-x5|$ and supplies these values to output terminals z1–z9. The first correlation is calculated when the data set a (a1, a2, ... ) is supplied to the shift register X to a state X1=a1, X2=a2, X3=a3, X4=a4, X5=a5 and the data set b (b1, b2, ... ) is supplied to the shift register Y to a state Y1=b5, Y2=b4, Y3=b3, Y4=b2 and Y5=b1, so that the output terminals z1–z9 respectively provide $|b5-a1|$, $|a1-b4|$, $|b4-a2|$, $|a2-b3|$, $|b3-a3|$, $|a3-b2|$, $|b2-a4|$, $|a4-b1|$ and $|b1-a5|$. In this manner it is rendered possible to simultaneously obtain, in parallel manner, the correlations $c_{ij}$ for L=1–9 at the step K=1 in FIG. 1A, namely those in the squares 15, 14, 24, 23, 33, 32, 42, 41 and 51. Switches S1–S9 constituting a switch group 23 are all closed in this state by the sequence control circuit 22 to store the output signals of the terminals z1–z9 in counters T1–T9 constituting a parallel counter 24. More specifically the counter T1 stores $c_{1,5}$ ($c_{ij}$ for i=1, j=5) for K=1, the counter T2 stores $c_{1,4}$ for K=1, the counter T3 stores $c_{4,2}$ for K=1, the counter T4 stores $c_{2,3}$ for K=1, and the counters T5, T6, T7, T8 and T9 store $c_{3,3}$, $c_{3,2}$, $c_{4,2}$, $c_{4,1}$ and $c_{5,1}$ respectively. The counters T1–T9 are controlled by the sequence control circuit 22. Subsequently the sequence control circuit 22 advances the data in the shift registers X, Y by a step to attain a state X1=a2, X2=a3, X3=a4, X4=a5, X5=a6; Y1=b6, Y2=b5, $Y3=b4$, $Y4=b3$, $Y5=b2$, at which the second calculation of correlation for $K=2$ is conducted to provide $|b6-a2|$, $|a2-b5|$, $|b5-a3|$, $|a3-b4|$, $|b4-a4|$, $|a4-b3|$, $|b3-a5|$, $|a5-b2|$ and $|b2-a6|$ at the output terminals z1-z9, corresponding to the correlations $c_{ij}$ for $L=1-9$ at $K=2$ in FIG. 1A, namely those in the squares 26, 25, 35, 34, 44, 43, 53, 52 and 62. These values are added to the values already stored in the parallel counter 24. In this manner the calculation of one line in FIG. 1A is completed during a single transfer of the data a and b respectively in the shift registers X and Y, and the values of the correlations C(L) shown in FIG. 1B are stored in the counter 24 after eight data shifts of $K=1-8$. More specifically the counter T1 stores the sum C(1) for $L=1$, the counter T2 stores the sum C(2) for $L=2$, and the counters T3, T4, T5, T6, T7, T8 and T9 respectively store the sums C(3), C(4), C(5), C(6), C(7), C(8) and C(9) for $L=3$, $L=4$, $L=5$, $L=6$, $L=7$, $L=8$ and $L=9$. An operating part 25 determines, from the output signals of said counter 24, the position of minimum value, i.e. $L=6$ in the illustrated example. In this manner it is possible to determine a mutual position with the strongest correlation between the data sets a and b. For an additional precision, a fractional shift of L for attaining the maximum correlation can be determined by differentiating the distribution of correlation shown in FIG. 1B (practically calculating the differences between adjacent values of correlations or between every other values etc.) and calculating the crossing point with the zero level as shown in FIG. 1C. FIG. 1C shows the plotting of the difference of adjacent values of C(L), i.e. $D(L)=C(L)-C(L+1)$, at the central point between L and $L+1$, and the target position of shift is $J=5.7$ or $L=J+0.5=6.2$ where the curve crosses the zero level from (+)— side to (—)— side as indicated by an arrow. The strongest correlation between two data sets can be determined simply from the zero level position of the value J if the data shown in FIG. 1C are obtained directly instead of those shown in FIG. 1B. FIG. 5 shows an embodiment for directly determining the differential D(L) as shown in FIG. 1C instead of C(L) shown in FIG. 1B, wherein the difference between adjacent values of C(L) is used as said differential. In a subtracting part 26, a subtractor U1 calculates the difference of two input signals z1 and z2, a subtractor U2 calculates the difference of two input signals z2 and z3, and subtractors U3-U8 similarly calculate the differences respectively of input signals z3 and z4, z4 and z5, z5 and z6, z6 and z7, z7 and z8, and z8 and z9. Switches S11-S18 constituting a switch group 27 are controlled by a sequence control circuit 22 and respectively transmit the output signals of said subtractors U1-U8 to a counter part 28, wherein counters V1-V8 thus store the sums of $K=1$ to 8. More specifically said counters V1-V8 store the values D(J), or D(1)-D(8), corresponding to $J=1-8$ shown in FIG. 1C. An operating part 29 determines, from the distribution as shown in FIG. 1C, the crossing point with the zero level.

Figure 5:
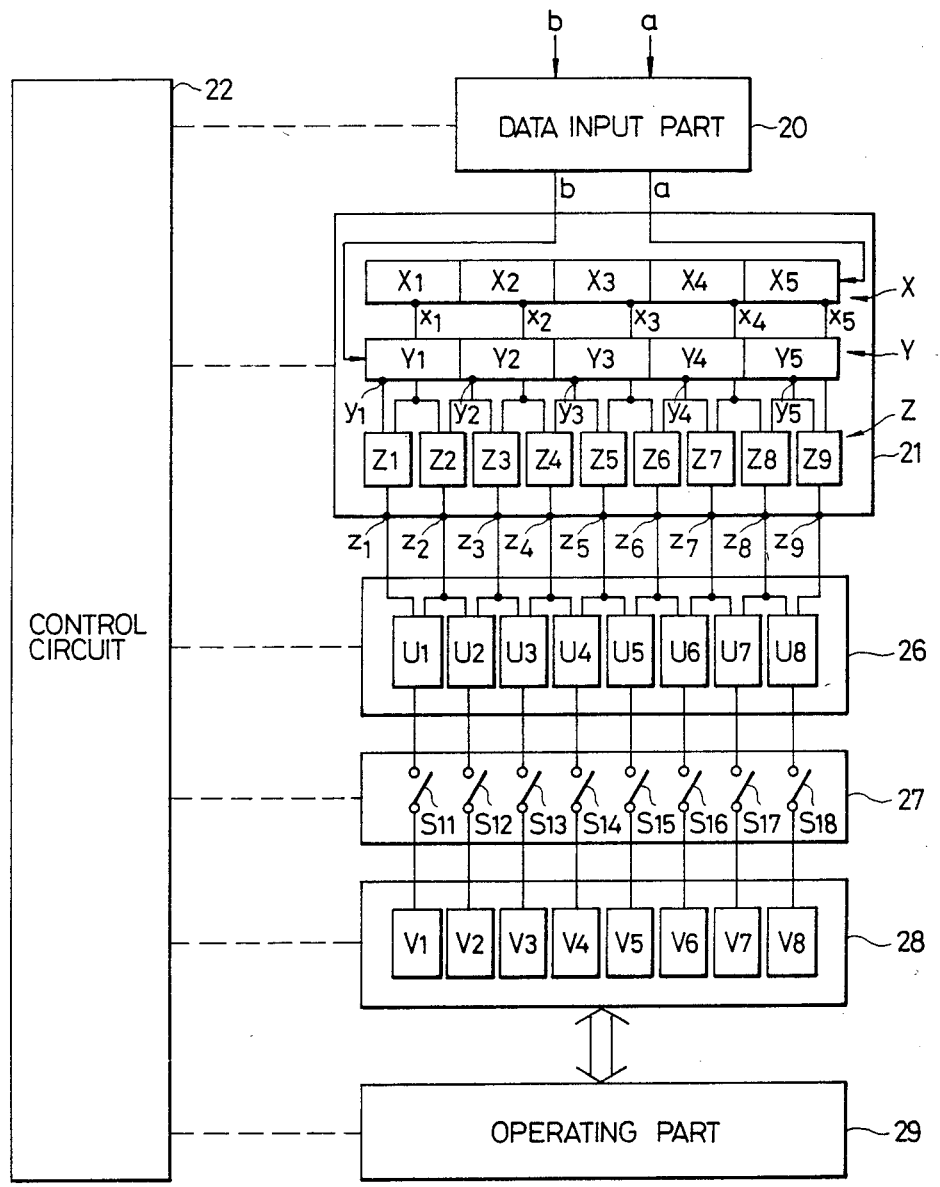
FIG. 5 is a block diagram of a modified first embodiment.
Figure 6A:
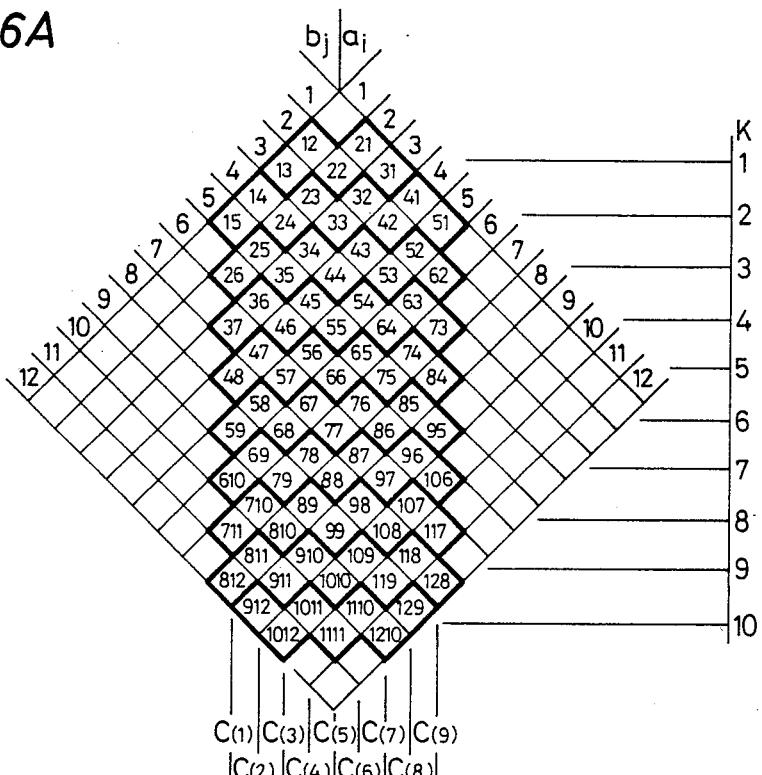
FIG. 6A is an explanatory view showing a variation according to the principle of the first embodiment.
Figure 6B:
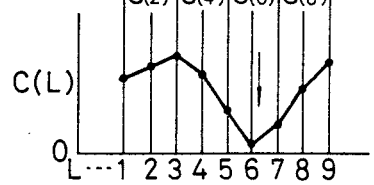
FIG. 6B is a chart showing the distribution of correlations.
Figure 6C:
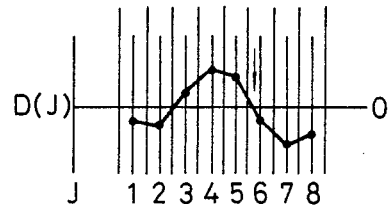
FIG. 6C is a chart showing the differentials corresponding to the correlations shown in FIG. 6B.

FIGS. 6A to 6C show an embodiment in which the number of data (L) is changed in a part of data shifts to increase the weight of the central area. In the calculations for the steps of $K=1-10$, certain squares corresponding to those for $K=1$ and $K=10$ may contain inappropriate values since either one of the shift registers X, Y does not contain the signals or contains values irrelevant to the calculation of the correlation. Therefore, in executing the embodiment shown in FIG. 6A, certain switches in the switch group 23 or 27 in FIG. 4 or 5 are opened, under the control of the sequence control circuit 22, in order to avoid the transmission of inappropriate results to the counter 24 or 28. FIGS. 6B and 6C respectively show the obtained sums C(L) and the corresponding differentials D(J). Also in the case shown in FIG. 6A, the differential, practically the difference between adjacent values, i.e. $D(L)=C(L)-C(L+1)$, or the difference between every other values, i.e. $D(L)=C(L)-C(L+2)$, can be obtained in two manners. The first method consists of firstly calculating the summed correlation C(L) as shown in FIG. 6B and then obtaining said differential according to the equation $D(L)=C(L)-C(L+1)$, and may not be appropriate in a calculation process with varying number of items to be summed, if said number of items to be summed is relatively limited for each stage of K. This drawback can be prevented in the second method in which subtractions are effected in the subtracting circuit 26 shown in FIG. 5 for each stage of $K=1-10$, and, if the subtraction cannot be conducted because of the absence of a signal at a stage $K=1$ or 10, corresponding switches in the switch group 27 are opened to inhibit the data transfer to the counter 28. The aforementioned drawback can be prevented since the subtraction is always effected between a pair of data.

Now, as examples of the above-described embodiment, there will be explained a case of converting the data of each set into binary signals, a case of converting into 7-bit signals and a case of dealing with said data in analog form.

Figure 7:
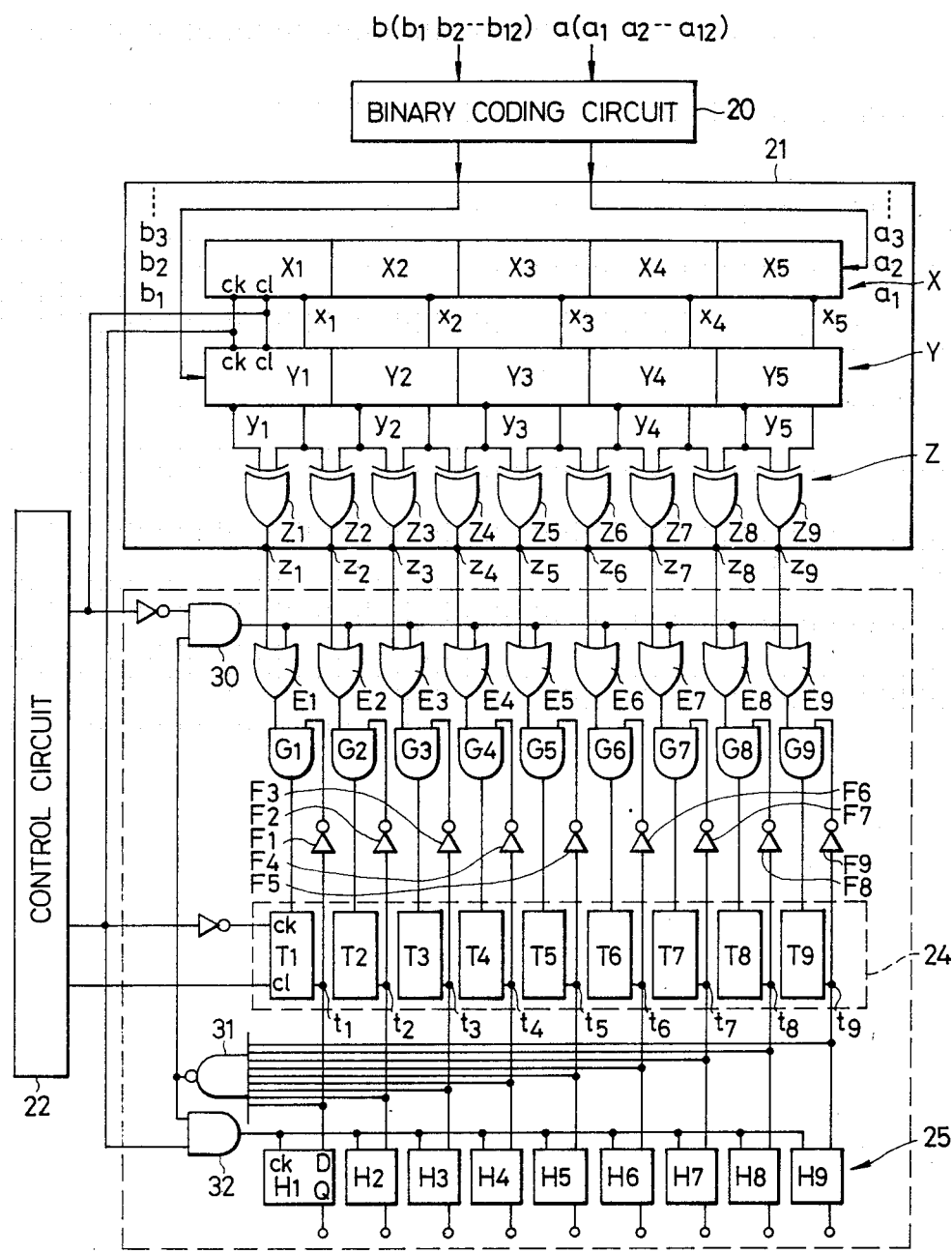
FIG. 7 is a circuit diagram showing a first example of the first embodiment.

FIG. 7 shows a first example of the calculating apparatus for converting the data into binary signals, which is so constructed as to conduct the calculation as shown in FIG. 1A for obtaining the distribution of correlation corresponding to C(L) in FIG. 1B and to determine the value of L for minimizing said C(L). Two sets of analog data a1, a2, ..., a12 and b1, b2, ..., b12 are supplied, through a binary digitizing circuit 20, into 5-bit shift registers X and Y in the illustrated directions. The cleared state of counters T1-T9 in a counter part 24 is released immediately before a state $X1=a1$, $X2=a2$, ..., $X5=a5$, $Y1=b5$, $Y2=b4$, ..., $Y5=b1$ is reached by successive data shifting, corresponding to the closing of all the switches S1-S9 in FIG. 4. Consequently the counters T1-T9 start to count the correlations C(L). The correlation between bits $X_i$ and $Y_j$ is calculated by a correlation calculating part Z composed of exclusive OR gates Z1-Z9. Each of the output terminals z1-z9 of said exclusive OR gates outputs a signal "0" or "1" from a block 21, respectively when $x_i=y_j$ or $x_i \neq y_j$. At the stage of calculation for $K=1$, an AND gate 30 outputs an output signal "0" so that OR gates E1-E9 transmit the output signals of the gates Z1-Z9. In the illustrated example a 4-bit counter can be used for the maximum count of 8 corresponding to $K=1-8$. Output signals t1-t9 corresponding to the most significant bits of the counters T1-T9 remain always zero during the stages of $K=1-7$ to provide signals "1" to AND gates G1-G9 through inverters F1-F9, whereby the output signals of the gates Z1-Z9 are transmitted to the counters T1-T9. The sequence control circuit 22 shifts the data in the shift registers X, Y in succession and correspondingly controls the counters T1-T9 to perform counting corresponding to said data shifts for $K=1-7$. In this manner the counters T1-T9 count the number of absence of correlations in the stages $K=1$ to 7. Upon completion of the last calculation for K=8 in which X1=a8, X2=a9, X3=a10, X4=a11, X5=a12, Y1=b12, Y2=b11, Y3=b10, Y4=b9 and Y5=b8, the sequence control circuit 22 supplies a signal to the AND gate 30 to output a signal "1" which is supplied in turn to the AND gates G1–G9. After the calculation for the stage K=8 and the corresponding count of said calculation by the counters T1–T9 through the gates G1–G9, a counter having the largest content, namely having encountered the absence of correlation throughout the stages K=1–8, outputs a signal "1" to the most significant bit t1–t9, whereby an AND gate G1–G9 corresponding to such counter is disabled. Consequently said counter does not perform counting operation in response to subsequent clock signals from the control circuit 22 but retains its state. On the other hand, the counters T1–T9 not outputting the signal "1" at the most significant bits thereof at the completion of calculations for the stage K=8 still maintain the corresponding AND gates G1–G9 in enabled state, whereby said counters are still stepped up by the clock signal supplied from the control circuit 22 through the gate 30. In this manner all the counters, not outputting the signal "1" at the most significant bits thereof at the completion of calculations at the stage K=8, are stepped up in response to the subsequent clock signals. The counters corresponding to lower correlations already have higher counts, so that they soon output the signal "1" at the most significant bits thereof by the pulse counting subsequent to the calculation for the stage K=8, and each counter outputting such signal "1" terminates the counting operation since the corresponding AND gate is disabled by the corresponding inverter. In this manner the output signals t1–t9 of the most significant bits shift to the state "1" from the counters corresponding to lower correlations, and the number of counters outputting such signal "1" increases with the subsequent supply of clock signals. The shift registers X, Y, counters T1–T9 and masterslave D-type flip-flops H1–H9 are controlled by clock pulses supplied to input terminals ck thereof from the sequence control circuit 22. More specifically, in the present embodiment, the contents of the counters T1–T9 are renewed at the fall of a clock pulse from the sequence control circuit 22, or at the rise of a clock pulse supplied to said counters, while the D-type flip-flops H1–H9 perform memory operation at the rise of a succeeding clock pulse. Consequently, at a point when the contents of the counters are renewed at the fall of a clock pulse, said D-type flip-flops memorize the output signals of the most significant bits of said counters at the immediately preceding clock pulse. Thus, with the supply of clock pulses in succession, there is eventually reached a state in which only one counter outputs a signal "0" at the most significant bit while all others output signals "1", and the value of L corresponding to the position of such counter indicates the amount of shift to be obtained (L=6 in FIG. 1B). In response to a subsequent clock pulse all the counters T1–T9 output the signal "1" at the most significant bits thereof, whereby a NAND gate 31 outputs a signal "0". Thereafter an AND gate 32 continues to output a signal "0" to interrupt the clock pulses to the D-type flip-flops, which therefore retain an output pattern at the immediately preceding clock pulse where the most significant bits are all "1" except "0" in one position. The value of L corresponding to the position of the flip-flop providing such "0" output indicates the amount of shift to be determined, and the maximum correlation between the data sets a and b can be determined from said value of L. In the illustrated example the maximum correlation is reached at L=6 as shown in FIG. 1B.

Figure 8:
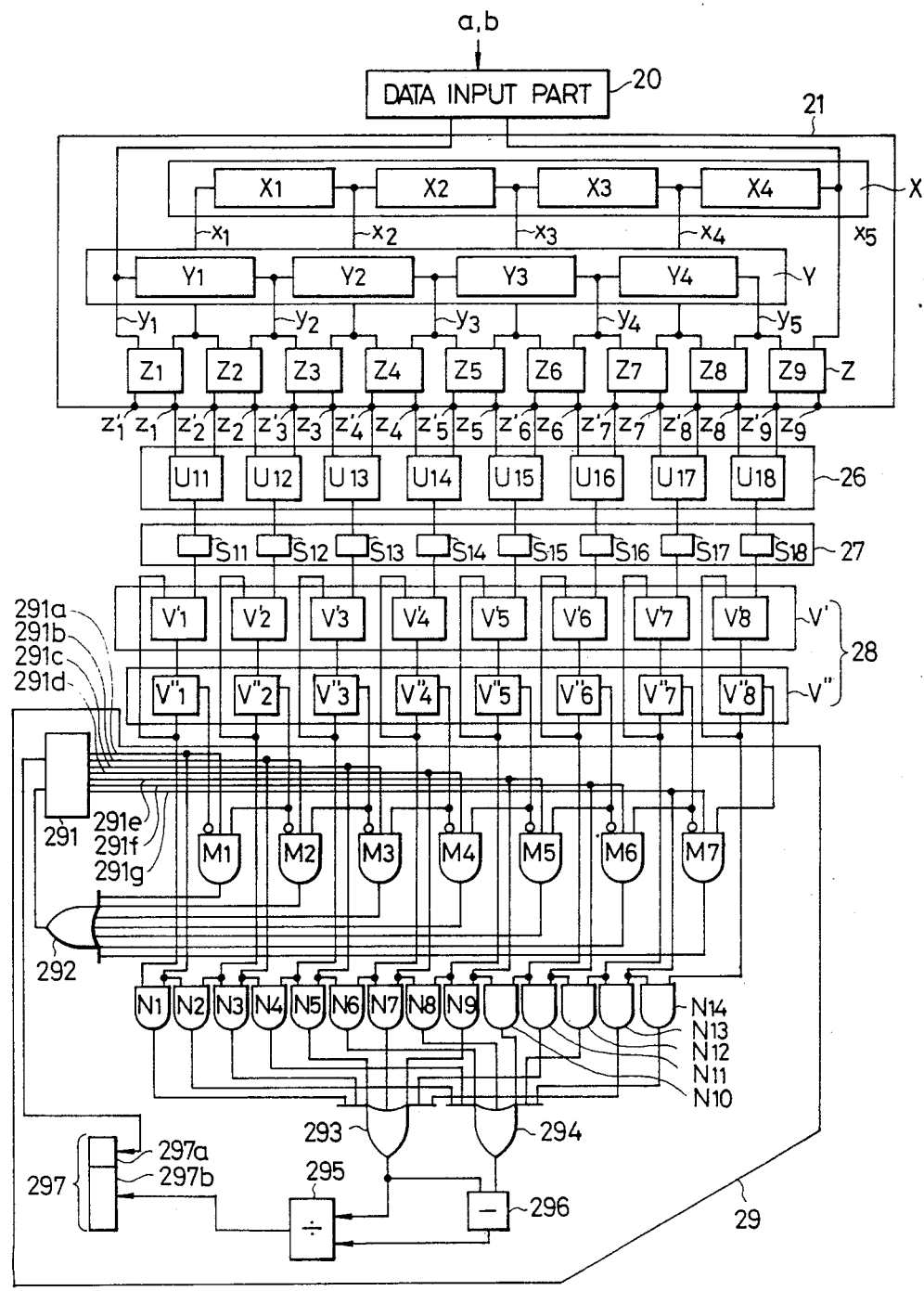
FIG. 8 is a circuit diagram showing a second example of the first embodiment.

Now reference is made to FIG. 8 showing a second example for converting the data into 7-bit signals, which is so constructed to conduct the calculations as shown in FIG. 6A thereby determining the distribution corresponding to D(J) shown in FIG. 6C through a differential calculation shown in FIG. 5, without obtaining the distribution shown in FIG. 6B, and to determine the amount of shift with a fractional accuracy.

Two data sets a and b are supplied, in the order of a1, b1, a2, b2, ..., a12, b12, to a data input part 20, which is shown in more detail in FIG. 9. The first input analog data a1 are converted, for example into a 7-bit signal, by an analog-to-digital (A/D) converter 201 and stored, sequentially from the most significant bit thereof, in a 7-bit shift register 202. Upon storage of the least significant bit, the content of said shift register 202 is transferred to an 8-bit shift register 203 having a most significant bit equal to zero. The subsequent data b1 are similarly A/D converted into a 7-bit signal which is first stored in the 7-bit shift register 202 and is then transferred to an 8-bit shift register 204. Thereafter the data in said registers 203, 204 are simultaneously transferred from the least significant bit for the convenience of calculations. The most significant bits are used as code bits. The subsequent data a2 are supplied to the shift register 202 when the data a1, b1 are respectively transferred to the shift registers X, Y. The data input part 20 and a block 21 are controlled, in a similar manner as in FIG. 7, by a sequence control circuit (not shown).

The block 21, constituting an essential part of the present invention, is composed of a shift register group X consisting of four 8-bit shift registers X1–X4, a shift register group Y of the opposite shift direction consisting of four 8-bit shift registers Y1–Y4, and a block Z consisting of circuits Z1–Z9 for calculating, in response to the output signals x1–x5 of the register group X and the output signals y1–y5 of the register group Y, the absolute value $|a_i - b_j|$ and the negative absolute value $-|a_i - b_j|$ of the 8-bit data $a_i$ and $b_j$. Naturally the number of bits in the A/D conversion, and the capacity and number of shift registers are not limited to those explained in relation to the present example. For the purpose of following explanation, it is assumed that the data $a_i$ and $b_j$ are converted, by said A/D conversion, into 8-bit signals of $a_i{}^0$ (least significant bit), $a_i{}^1$, $a_i{}^2$, $a_i{}^3$, $a_i{}^4$, $a_i{}^5$, $a_i{}^6$, $a_i{}^7$, $a_i{}^8$ (most significant bit) and $b_j{}^0$ (least significant bit), $b_j{}^1$, $b_j{}^2$, $b_j{}^3$, $b_j{}^4$, $b_j{}^5$, $b_j{}^6$, $b_j{}^7$, $b_j{}^8$ (most significant bit).

In the course of data shift subsequent to the A/D conversion, there is reached a state of output signals as follows at the output terminals x1–x5 and y1–y5;

x1=0, x2=$a_1{}^0$, x3=$a_2{}^0$, x4=$a_3{}^0$, x5=$a_4{}^0$,
y1=$b_4{}^0$, y2=$b_3{}^0$, y3=$b_2{}^0$, y4=$b_1{}^0$, y5=0.

The calculation for K=1 shown in FIG. 6A is initiated in this state. Then in response to a succeeding clock pulse supplied to the shift register groups X, Y, there are obtained following output signals:

x1=0, x2=$a_1{}^1$, x3=$a_2{}^1$, x4=$a_3{}^1$, x5=$a_4{}^1$,
y1=$b_4{}^1$, y2=$b_3{}^1$, y3=$b_2{}^1$, y4=$b_1{}^1$, y5=0.

The most significant bits of the data $a_i$, $b_j$ are outputted in succession in this manner. The block Z for calculating the absolute value of the difference of 8-bit data will be explained in more detail by FIG. 10 showing the circuit Z4 receiving the output signals from the terminals x2 and y3. In FIG. 10, a carry-over flip-flop 221b of a subtracter 221 is cleared before the transfer of the data $a_1^0$ and $b_2^0$. (The data shift in the registers X, Y is not conducted in continuous manner in response to the clock pulses for the entire system but is controlled in such a manner that it is interrupted for a while after the shift of 8-bit data $a_i$, $b_j$. Said flip-flop 221b is cleared in such interruption of shift.) The subtracter 221a performs a calculation $\delta_m = \alpha_m - \beta_m - \gamma_m$ as shown in FIG. 11, wherein $\alpha_m$, $\beta_m$, $\gamma_{m-1}$, $\gamma_m$ and $\delta_m$ are input and output signals of said subtracter. In this manner the difference between the data $a_1$, $b_2$ is calculated in succession from the least significant bits $a_1^0$ and $b_2^0$ to provide, as the output signal $\delta_m$, the difference $c_{ij}$ for $i=1$ and $j=2$, namely $c_{1,2} = a_1 - b_2$ in succession from the least significant bit thereof and is transferred to an 8-bit shift register 222. When the eighth code bit appears at the output $\delta_m$, a pulse is supplied to a clock pulse input terminal 223 of a code memory D-type flip-flop 224 to memorize the content of said code bit, indicating the positive or negative sign, in said flip-flop 224. In case said code bit is "0", the content of the 8-bit shift register 222 is transferred to an absolute value output terminal z4 through an AND gate 227 and an OR gate 228. Also in case said code bit is "1", said content is transferred to said output terminal z4 after inversion by a NAND gate 226 and through an OR gate 228. Another terminal z4' supplies a negative absolute value for the purpose of a subsequent calculation. In this manner the absolute value $c_{1,2} = |a_1 - b_2|$ of the data $a_1$ and $b_2$ is obtained as an 8-bit signal. In practice, however, it is necessary to add 4 bits of "0" on top of the most significant bit of the absolute value $c_{1,2}$ in order to match the number of bits with that of a cumulative register to be explained later, which has 12 bits in the present example. Said additional 4 bits are shifted during the aforementioned interruption of data shift in the shift registers X, Y, and this is achieved by a shifting of 4 bits of empty data in the shift register 222 since the output signal $\delta_m$ of the subtracter 221a maintains the code signal in the eighth bit of the data $c_{1,2}$ even during said interruption. The number of bits of such shifting of empty data has naturally to be increased if the number of data to be summed increases. Hereinafter $c_{12}{}^\sim$ will represent the data $c_{1,2}$ plus the above-mentioned 4-bit empty data. Therefore, the correlation output signals corresponding to the stage $K=1$ shown in FIG. 6A appear at the terminals z1–z9, z1'–z9' in the following manner:

$$\begin{array}{cccccccc} z1 & z2' & z2 & z3' & z3 & z4' & z4 & z5' \\ * & * & * & -c_{\tilde{13}} & c_{\tilde{13}} - c_{\tilde{12}} & & c_{\tilde{12}} - c_{\tilde{22}} & \\ \hline J=1 & J=2 & J=3 & & J=4 & \end{array} \quad (1)$$

$$\begin{array}{cccccccc} z5 & z6' & z6 & z7' & z7 & z8' & z8 & z9' \\ c_{\tilde{22}} - c_{\tilde{21}} & c_{\tilde{21}} - c_{\tilde{31}} & c_{\tilde{31}} & * & * & * & & \\ \hline J=5 & J=6 & J=7 & J=8 & \end{array}$$

wherein the mark * indicates an inappropriate output. These output signals are supplied to an adding part 26 comprising adders U11–U18 for calculating the difference of neighboring signals, and the results of additions, corresponding to the output signals from U1–U8 in FIG. 5, are supplied through a switching gate 27 to a counter 28, which is maintained in the cleared state until immediately before said supply. In the initial stage for $K=1$, as appropriate data are not obtained for $J=1, 2, 7, 8$ as shown in FIG. 6A or in the foregoing relation (1), gates S11, S12, S17 and S18 in the switching gate 27 are so controlled as to provide zero output signals. Similarly for the stage $K=10$ gates S11 and S18 corresponding to $J=1, 8$ are controlled to provide zero output signals. The counter 28 is composed of an adder V' and a 12-bit shift register V'', wherein the adder V' adds 12-bit data from the switching gate 27 to the cumulative data from the shift register V'' and returns the obtained data to the shift register V'' for continuing the cumulative addition. By repeating the above-described procedure from $K=1$ to $K=10$, the data corresponding to FIG. 6C are stored in registers V1''–V8'' constituting the shift register V''. More specifically the data for $J=1, J=2, \ldots, J=8$ are respectively stored in the registers V1'', V2'', ..., V8''. Subsequently the most significant bits of the shift registers V1''–V8'' are checked in order to locate the crossing point with the zero level from (+)-side to (−)-side shown in FIG. 6C. As an example, in case the contents accumulated in the shift registers V1''–V8'' in the stages of $K=1$–8 are those shown in FIG. 6C, the most significant code bits of shift registers V1''–V8'' will be as shown in Tab. 1:

TABLE 1

| J | 1 | 2 | 3 | 4 | 5 | 6 | 7 | 8 |
|---|---|---|---|---|---|---|---|---|
| Shift register | V1'' | V2'' | V3'' | V4'' | V5'' | V6'' | V7'' | V8'' |
| Code bit | 1 | 1 | 0 | 0 | 0 | 1 | 1 | 1 |

AND gates M1–M7 identify said crossing point by gating neighboring code bits after inverting the one corresponding to a smaller J value. A control circuit 291 controlled by the sequence control circuit 22 supplies readout pulses in succession to output lines 291a–291g. In the present example, an OR gate 292 outputs an output signal "1" when the line 291e alone is in the state "1" while other lines are in the state "0", and said signal is transmitted to the circuit 291 to fix such state, whereby AND gates N9 and N10 among AND gates N1–N14 are enabled. Thus the content $D_{(5)}$ of the shift register V5'', corresponding to the case of $J=5$, is transmitted through the AND gate N9 to an OR gate 293, while the content $D_{(6)}$ of the shift register V6'', corresponding to the case of $J=6$, is transmitted through the AND gate N10 to an OR gate 294. Said content $D_{(5)}$ passing through the OR gate 293 is stored in a first register in a divider 295, and a result of subtraction $D_{(5)}-D_{(6)}$, obtained by subtracting the content passing through the OR gate 294 from that passing through the OR gate 293, is stored in a second register in said divider 295. The divider 295 divides the content $(D_{(5)}-0)$ in the first register with the content $(D_{(5)}-D_{(6)})$ of the second register and stores the result of said division in lower 6 bits of a memory 297.

On the other hand, when the aforementioned state of the line 291e alone outputting the signal "1" is fixed, the control circuit 291 enters, into a memory 297a, a signal that the crossing point with zero level is positioned between $J=5$ and $J=6$. Blocks 26–29 are naturally controlled by the sequence control circuit. In this manner the memory 297a stores "5" while the memory 297b stores "0.7", representing a figure "5.7" as an amount of mutual shift, including fractional amount, providing the strongest correlation between two data sets a1, a2, ..., a12 and b1, b2, ..., b12.

Figure 12:
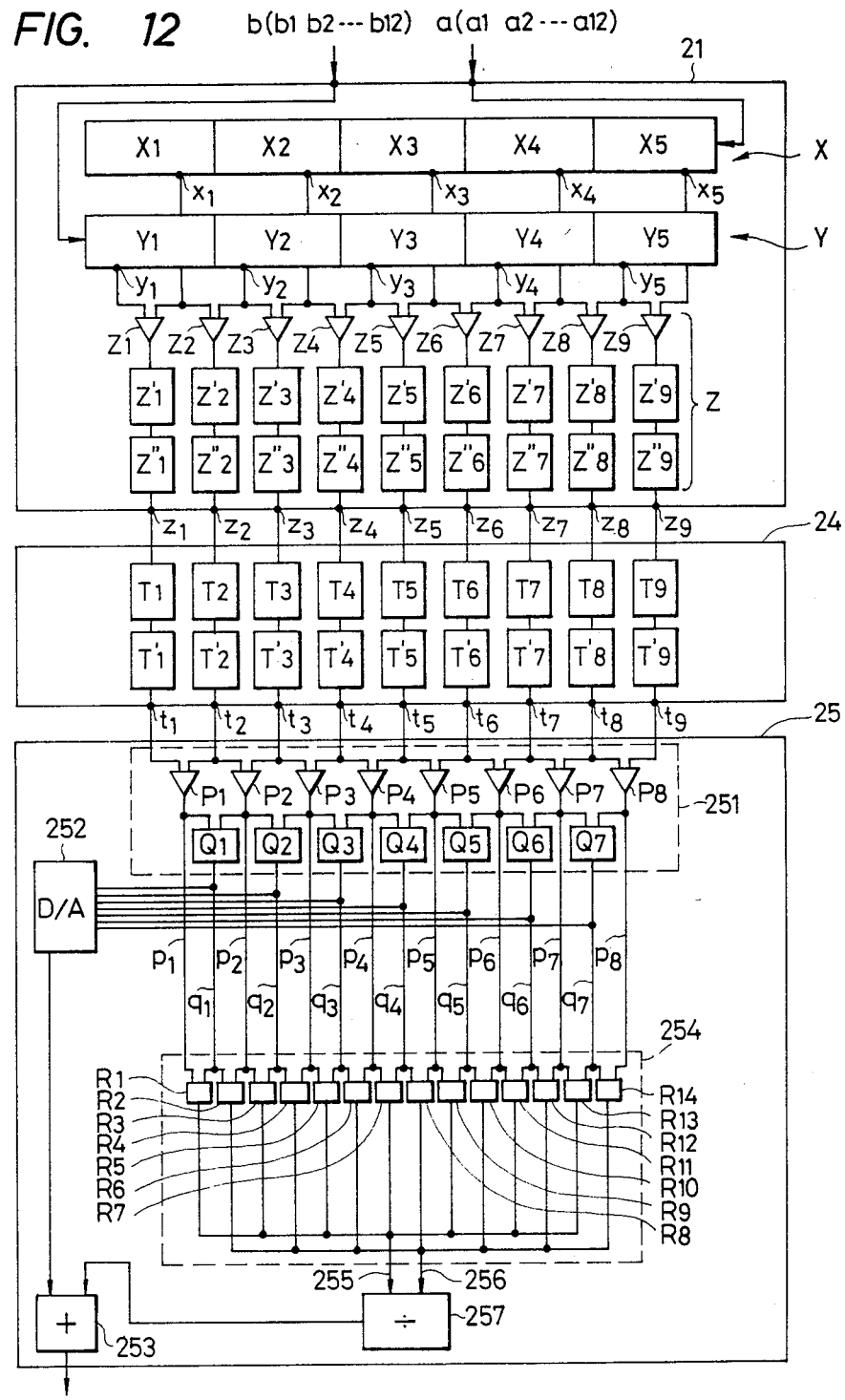
FIG. 12 is a circuit diagram showing a third example of the first embodiment.

Now reference is made to FIG. 12 showing a third example designed for processing the data in analog form and constructed to perform calculations shown in FIG.

Figure 4:
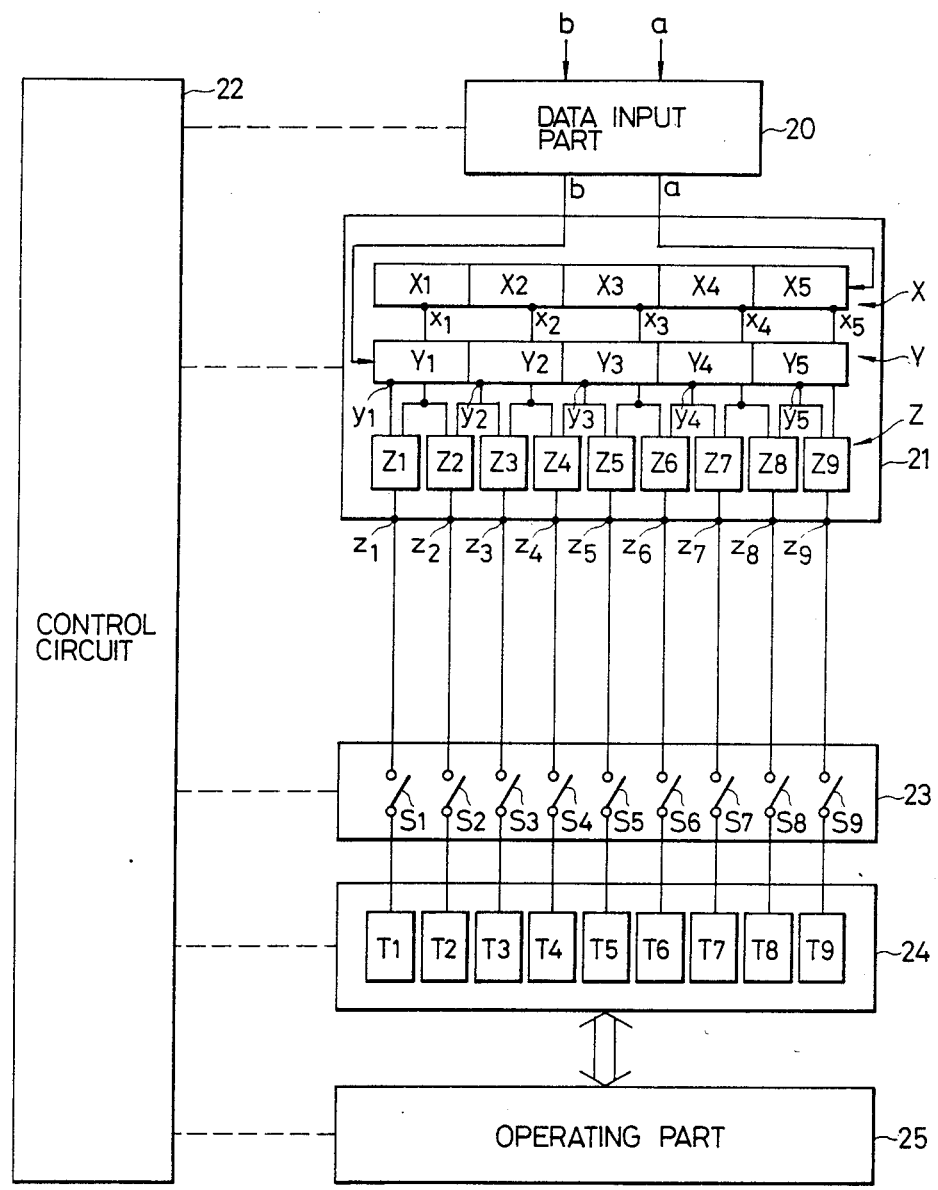
FIG. 4 is a block diagram of a first embodiment.
Figure 13:
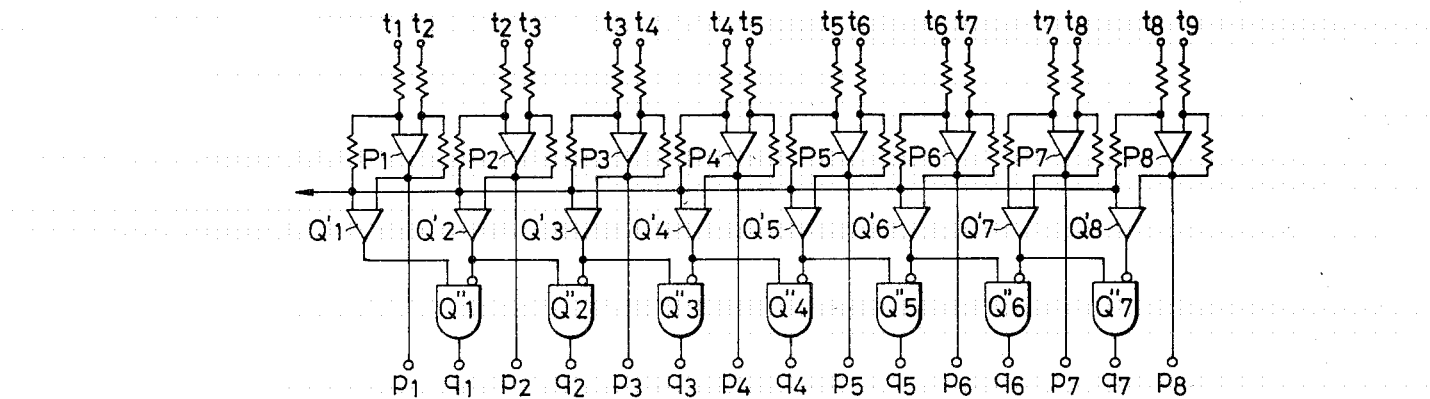
FIG. 13 is a circuit diagram showing the structure of a circuit block 251 shown in FIG. 12.

1C according to the basic structure shown in FIG. 4. Two analog data sets a (a1, a2, . . . , a12) and b (b1, b2, . . . , b12) are transferred in mutually opposite directions, into analog shift registers X, Y composed for example of charge-coupled devices. Transfer stages X1-X5, Y1-Y5 are provided with output terminals x1-x5, y1-y5 which are connected to differential amplifiers Z1-Z5 for performing subtractions ($X_i - Y_j$), and the results of said subtractions are transmitted through absolute value circuits Z1'-Z9' and peak-hold circuits Z1''-Z9'' to generate output signals $|X_i - Y_j|$ at output terminals z1-z9. In a counter 24, integrating circuits T1-T9 calculate the sum for the stages K=1-8 shown in FIG. 1A and peak-hold circuits T1'-T9' hold the obtained sum until the succeeding sum is calculated. Consequently output terminals t1-t9 of said peak-hold circuits T1'=T9' generate values C(L) as shown in FIG. 1B. In the present example the switch group shown in FIG. 4 is dispensed with since the integrating circuits T1-T9 are operated by a sequence control circuit. An operating part 25 determines the amount of shift including fraction in response to the output signals from said terminals t1-t9. A circuit block 251 including differential amplifiers P1-P8 and circuits Q1-Q7 for determining the crossing point with zero level is composed, as an example, as shown in FIG. 13. Analog output signals p1-p8 of the differential amplifiers P1-P8 correspond to the output signals for J=1-8 shown in FIG. 1C, and are converted, if positive, to a constant value $v_H$ corresponding to the H-level in the logic circuit, or, if negative, to a constant value $v_L$ corresponding to the L-level, by means of comparators Q1'-Q8'. AND gates Q1''-Q7'' respectively receive output signals of two neighboring comparators after inversion of a signal thereof, so that an AND gate positioned corresponding to the crossing point with zero level in FIG. 1C alone provides a signal "1" while other AND gates provide signals "0". In the example shown in FIG. 1C, the output signal q5 of the AND gate Q5'' alone assumes the level "1". A digital-to-analog (D/A) converting block 252 identifies that the output signal q5 is in the state "1" and supplies a voltage q5×Vr to an adder 253. In a block 254 composed of analog switches R1-R14, two analog switches R9, R10 receiving the output signal q5 are turned on. Consequently a p-th output signal from the left in the differential output signals p1-p8, i.e. the output signal p5, is supplied to an output terminal 255, while a (p+1)th output signal from the left, i.e. the output signal p6, is supplied to an output terminal 256. A divider 257 performs a calculation {p5/(p5−p6)}×Vr and supplies an output signal corresponding to a fraction to the adder 253, which provides an output signal corresponding to the addition of q5×Vr mentioned above and {p5/(p5−p6)}×Vr, which represents the amount of shift including fraction wherein Vr is the amount of one shift and corresponds to J=5.7 in the present example. In the present example the sequence control circuit 22 controls the blocks 21, 24, 25 to detect a state of strongest correlation between two data sets.

In the foregoing second and third examples the fractional part of the position of the crossing point is determined from the difference between the immediately neighboring data, but similar data processing is also possible from the difference between every other neighboring data.

In the foregoing embodiment, the number $\xi$ of the stages X1, X2, X3, . . . , X$\xi$ constituting the first transfer means X and the number $\eta$ of the stages Y1, Y2, Y3, . . . , Y$\eta$ constituting the second transfer means Y may be so selected as to satisfy a relation $\eta = \xi$ or $\eta = \xi + 1$ as long as $\eta \geq 2$. In case of $\eta = \xi$, both transfer means can be so constructed as to provide, for example, following output signals $|y_1 - x_1|, |x_1 - y_2|, \ldots, |y_\xi - x_\xi|$, while in case of $\xi = \eta + 1$ both transfer means can be so constructed as to provide, for example, following output signals $|y_1 - x_1|, |x_1 - y_2|, |y_2 - x_2|, |x_2 - y_3|, \ldots, |y_\xi - x_\xi|, |x_\xi - y_{\xi+1}|$. Naturally in case $\eta = 2$, the data are processed to calculate $|y_1 - x_1|, |x_1 - y_2|$ and $|y_2 - x_2|$ in case of $\eta = \xi$, and to calculate $|y_1 - x_1|$ and $|x_1 - y_2|$ in case of $\eta = \xi + 1$.

In contrast to the foregoing first embodiment in which two data sets are respectively supplied to separate shift registers for comparing the output signals therefrom, a second embodiment to be explained in the following comprises serially connected plural shift registers into which data are time-sequentially transferred alternately from two data sets.

Figure 14:
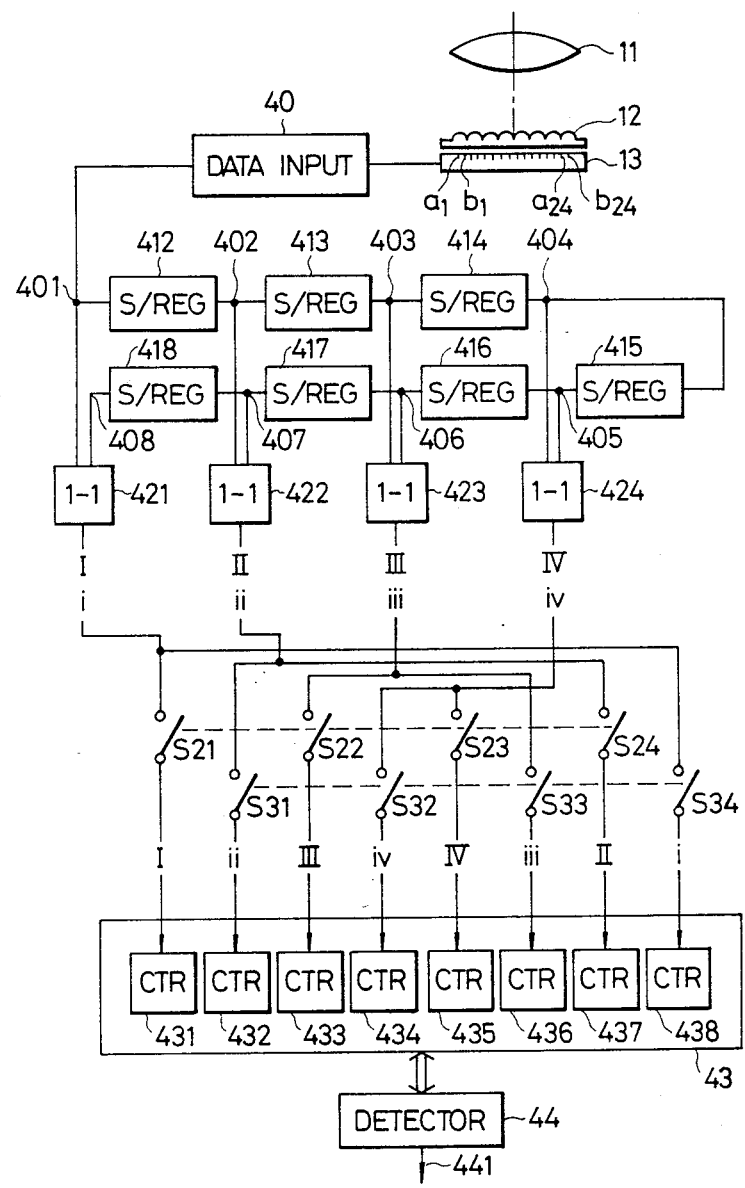
FIG. 14 is a block diagram of a second embodiment of the present invention.

FIG. 14 shows the fundamental structure of said second embodiment, wherein a data input unit 40 comprises a sample-hold circuit for holding the signals a1, b1, . . . supplied from an array 13 of photoelectric converting elements, for example a charge-coupled device, and a circuit for converting said signals into digital signals of a predetermined number of bits in case the succeeding process is conducted in digital manner and outputting thus converted signals sequentially from the least significant bit thereof.

Blocks 412-418 are composed of analog or digital shift registers mutually connected to transfer the signals in serial manner. Said shift registers are respectively provided with output terminals 402-408. Blocks 421-424 are circuits for determining the absolute value of a difference.

Figure 15A:
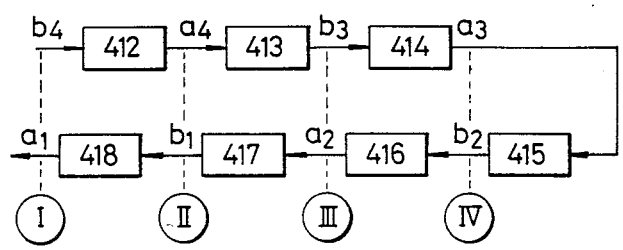
FIGS. 15A to 15D are charts showing the steps of data transfer in the apparatus shown in FIG. 14.
Figure 16:
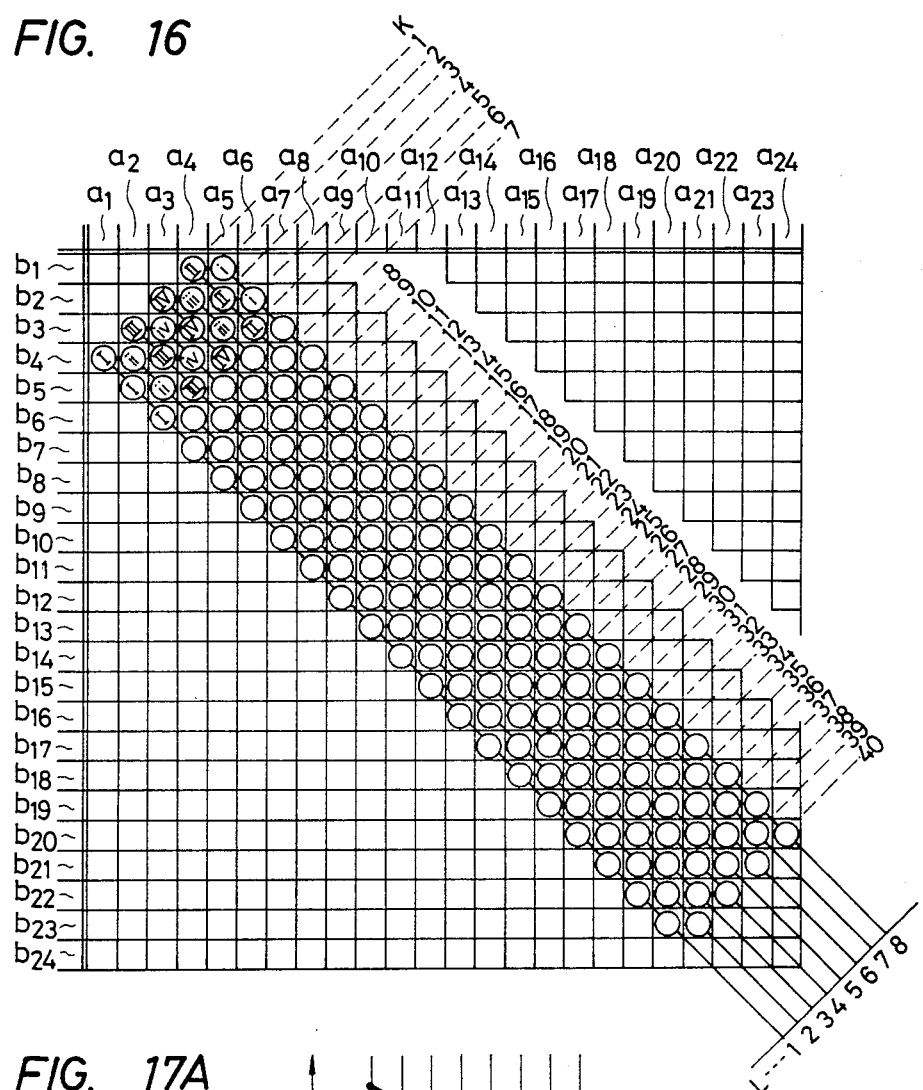
FIG. 16 is a view showing the principle of the second embodiment.
Figure 17A:
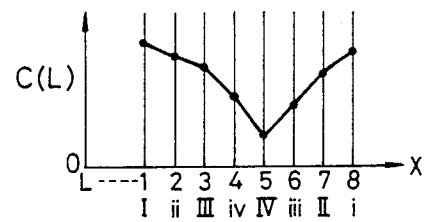
FIG. 17A is a chart showing the distribution of correlations.

FIG. 15A shows a state in the course of signal transfer, wherein the first data a1 is given at the terminal 408, the second data b1 at the terminal 407, the third data a2 at the terminal 406, . . . , and the eighth data b4 at the terminal 401. The combination of the data in this state corresponds to a stage K=1 shown in FIG. 16, and the output signals "I", "II", "III" and "IV" of the correlation calculating blocks 421, 422, 423, 424 for determining the absolute value of the difference correspond respectively to the positions L=1, L=7, L=3 and L=5 shown in FIG. 16. A subsequent shift of the data by a step creates a state shown in FIG. 15B, wherein the combination of the data corresponds to a stage K=2 shown in FIG. 16, and the output signals "i", "ii", "iii" and "iv" of said blocks respectively correspond to the positions L=8, L=2, L=6 and L=4 for the stage K=2 in FIG. 16. After a further transfer of the data there is attained a state shown in FIG. 15C in which the output signals "I", "II", "III" and "IV" correspond respectively to the positions L=1, L=7, L=3 and L=5 for the stage K=3 shown in FIG. 16 and after the transfer of still another step there is attained a state shown in FIG. 15D in which the output signals "i", "ii", "iii" and "iv" correspond respectively to the positions L=8, L=2, L=6 and L=4 at the stage K=4 shown in FIG. 16. In this manner, for an odd stage of K the output signals of the correlation calculating blocks 421-424 correspond respectively to the positions L=1, L=7, L=3 and L=5 while for an even stage of K said output signals correspond respectively to the positions L=8, L=2, L=6 and L=4. It therefore becomes necessary to process the results of calculations according to the parity of K and to re-arrange the output signals in the order of L. These functions are achieved by switches S21–S34. An adding unit comprising counters 431–438 store the correlations C(1), C(2), C(3), C(4), C(5), C(6), C(7) and C(8) respectively corresponding to the positions L=1–8 shown in FIG. 17A. For an odd stage of K the switches S21–S24 are closed while the switches S31–S34 are opened to add the output signals I, II, III, IV of the calculating blocks 421–424 to the counters 431, 437, 433 and 435. On the other hand, for an even stage of K, the switches S31–S34 are closed while the switches S21–S24 are opened to add the output signals i, ii, iii and iv of the calculating blocks 421–424 respectively to the counters 438, 432, 436 and 434. In this manner the counter 43 stores the correlations corresponding to the shift positions L=1–8 as shown in FIG. 17A when the data shifts from K=1 to K=40 are completed. Subsequently a maximum correlation detecting unit 44 discriminates the contents of said counter 43 to identify a value of L giving the strongest correlation, for example L=5 in FIG. 17A, and supplies said value to an output terminal 441. Said value represents the mutual displacement of the data set a1–a24 and the data set b1–b24 providing the strongest correlation. It will be understood that, in the example shown in FIG. 16, each set is composed of 24 data.

Figure 17B:
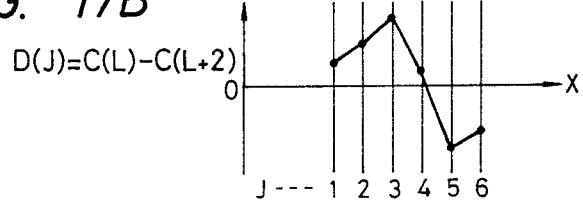
FIG. 17B is a chart showing the difference between two data sets by a zero crossing point.

FIG. 18 shows a modification, in a part succeeding the switches shown in FIG. 14, capable of calculating the difference of C(L), for example D(J)=C(L) - C(L+2) as shown in FIG. 17B and determining the crossing point of D(J) with zero level from the value of L corresponding to the minimum value of C(L). This is achieved, for example, by subtracting the value of C(L) for L=3 from that for L=1 in FIG. 17A as the value for J=1 in FIG. 17B, then by subtracting the value of C(L) for L=4 from that for L=2 in FIG. 17A as the value for J=2 in FIG. 17B, and so on. These calculations are achieved by differential operators 451–453, switches S41–S43 to be closed only for odd values of K, switches S51–S53 to be closed only for even values of K, and an adder 46. Consequently, for an odd value of K, the operators 451, 452, 453 respectively perform subtractions (I−III), (III−IV) and (IV−II) and add the results to counters 461, 463 and 465 through switches S41–S43. Also for an even value of K, the operators 451, 452, 453 respectively perform subtractions (ii−iv), (iv−iii) and (iii−i) and add the results to counters 462, 464, 466 through the switches S51–S53. In this manner the calculations for the stages K=1–40 shown in FIG. 16 are completed by transferring the data a1, b1, a2, b2, . . . , a24, b24 through the shift registers 412–418, and the counters 461–466 respectively store values corresponding to D(1), D(2), D(3), D(4), D(5) and D(6) shown in FIG. 17B. Subsequently a maximum correlation detecting unit 47 calculates, from said values stored in the adder 46, a value of J corresponding to the crossing point of D(J) with zero level from (+)-side to (−)-side, or J=4.2 in the example shown in FIG. 17B, and generates an output signal 471.

Figure 19:
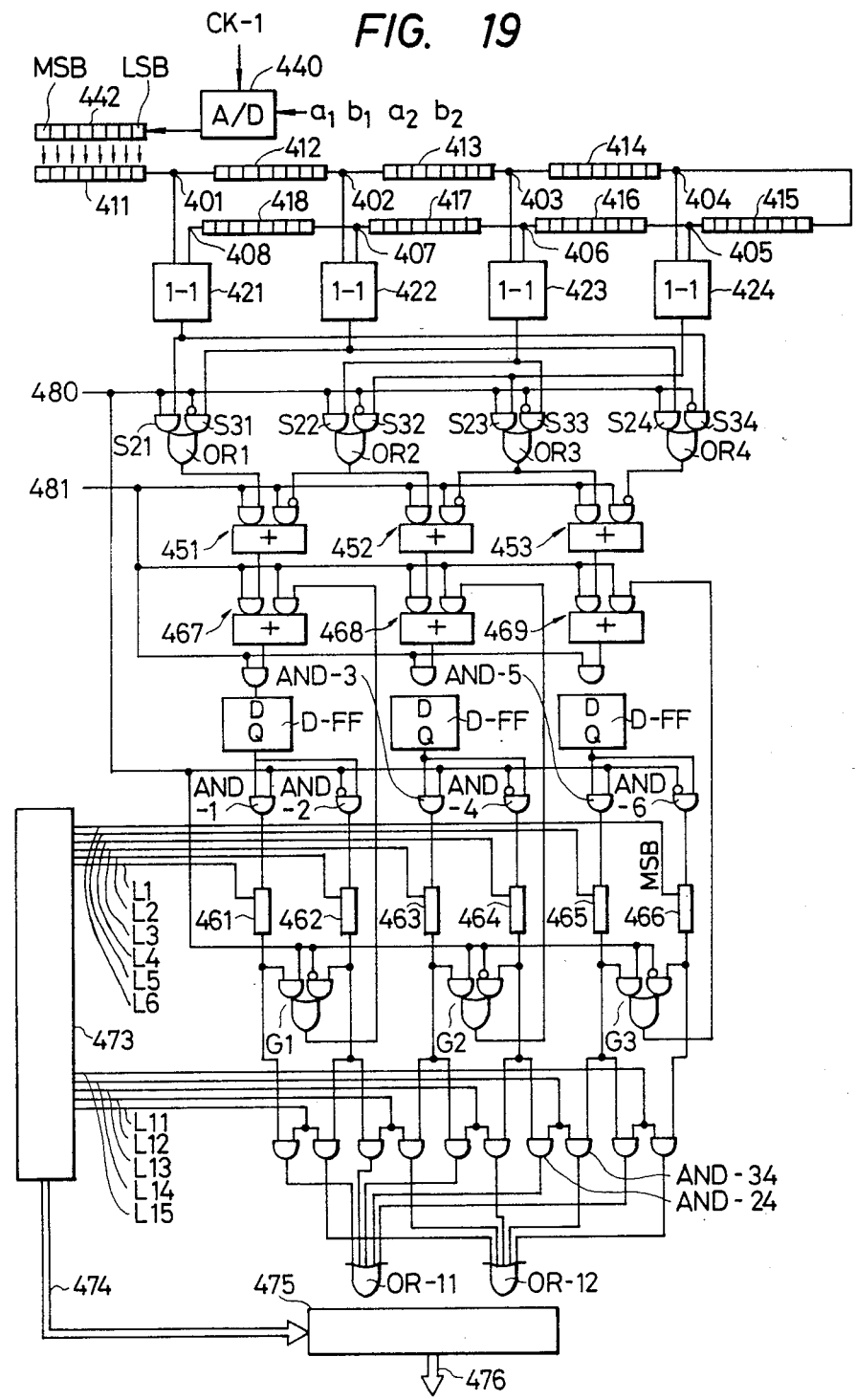
FIG. 19 is a circuit diagram showing the more detailed structure of the apparatus shown in FIG. 18.
Figure 20:
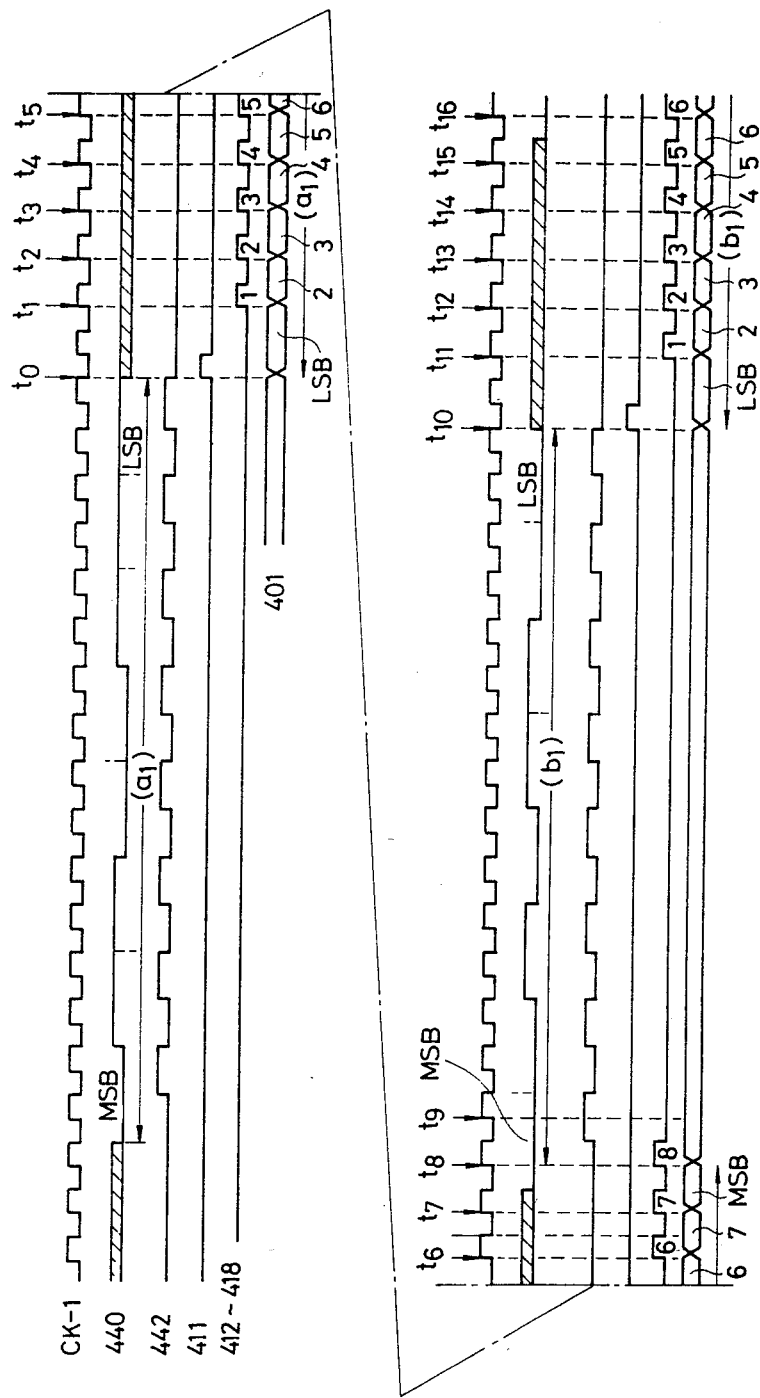
FIG. 20 is a timing chart showing the function in the initial state of the circuit shown in FIG. 19.

FIG. 19 shows a more detailed example of a circuit for digital processing according to the principle shown in FIG. 18. Analog data signals a1, b1, a2, b2, . . . are converted, by an A/D converter 440 operated by basic clock signals CK-1 supplied from a sequence control unit (not shown), into 8-bit digital data in the timing shown in FIG. 20 and are supplied in an order from the most significant bit thereof. An 8-bit serial-in-parallel-out shift register 442 receives and transfers said data signals in the timing shown in FIG. 20. When data of 80 bits are entered in the shift register 442, said data are transferred to an 8-bit parallel-in-serial-out shift register 411 at a time $t_0$. Then said data are transferred through shift registers 412–418 at timings $t_1$–$t_8$ corresponding to the rises of clock pulses. Subsequently the shift register 442 reads the succeeding data b1 at timings $t_9$–$t_{10}$, and said data are transferred in the same manner as explained above.

Simultaneously with the parallel data reading by the shift register 411, a signal representing the least significant bit appears at a terminal 401, and signals representing upper bits thereafter appear in succession with the progress of data transfer.

Figure 21:
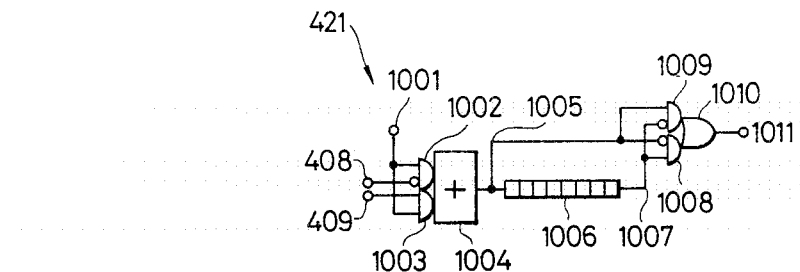
FIG. 21 is a circuit diagram showing the structure of a circuit 421 shown in FIG. 19.
Figure 22:
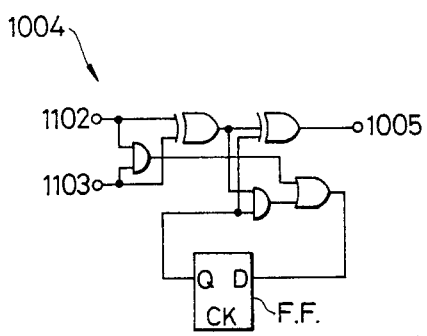
FIG. 22 is a circuit diagram showing the structure of an adder shown in FIG. 21.
Figure 15B:
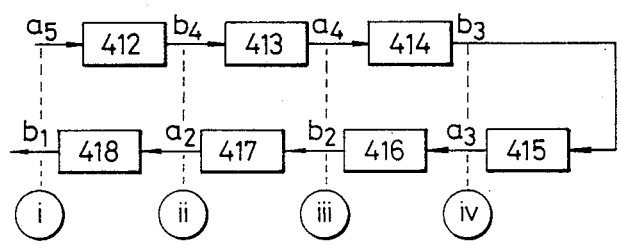
Figure 15C:
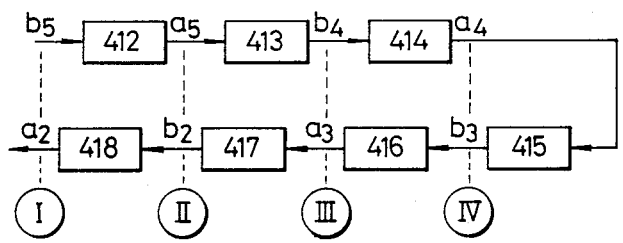
Figure 15D:
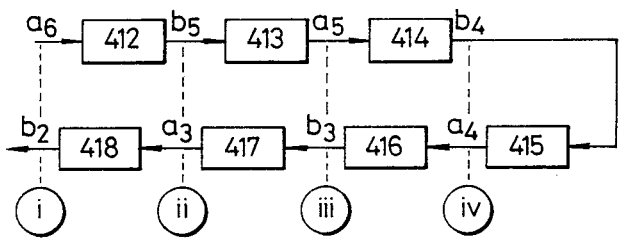

Parallel calculations of correlations are initiated when the data a1 are stored in the shift register 418, the data b1, a2, b2, a3, b3 and a4 are respectively stored in the shift registers 417–412 and the data b4 are stored in the shift register 411 in the course of signal transfer, and the calculations for the stage K=1 are conducted by circuits 421–424 for calculating the absolute value of difference, during the course of transfer of 8-bit data and during the subsequent interruption of said transfer. In this manner the calculations corresponding to I–IV in FIG. 15A are conducted in the operators 421–424 at the start of calculation, and the calculations corresponding to FIGS. 15B–15D are subsequently effected in succession. Now reference is made to FIGS. 21 and 24 for explaining the circuit 421. At the start of calculation, signals representing the data b4 and those representing the data a1 are respectively supplied to input terminals 408, 401 at timings $t_{70}$–$t_{77}$. AND gates AND1, AND2 are enabled by an input signal 1001 during a period from $t'_{70}$ to $t_{78}$. An adder 1004 is composed, as shown in FIG. 22, of a full adder and a carry-over flip-flop FF which is reset to restore the carry-over bit in response to a signal 1104 synchronized with a clock pulse CK-2 slightly preceding the clock pulse CK-1. A pulse U1 of said signal 1104 slightly preceding the signal 1001 at $t'_{70}$ is utilized for setting the output Q of the flip-flop FF to "0". The input signal 408 is supplied, after inversion, to the adder, whereby the adder 1004 calculates (b4−a1) at "I" for the stage K=1. According to the data transfer by the shift registers 412–418 and the corresponding resetting of the flip-flop FF effected at the timings shown in FIG. 24, the result of calculation (b4−a1) is supplied to an output terminal 1005 of the adder in the order of $f^1$ (least significant bit) . . . $f^8$ (most significant bit). Subsequently the flip-flop FF effects one more count to release a code bit $f^9$, and this state is fixed until $t'_{80}$ when the succeeding data transfer is initiated. During this period the signals representing said result of calculation $f^1$–$f^8$ are transferred in succession to an 8-bit shift register 1006 at timings synchronized with the fall of clock pulses CK-1. As soon as said signals $f^1$–$f^8$ are stored in said shift register 1006, the adder maintains an output signal 1005 representing the code bit $f^9$ for a period corresponding to the transfer of succeeding 14 bits. Consequently, if $f^9$ is "0" indicating a positive value, an AND gate 1008 is enabled to transfer the content of the shift register 1006 to an output terminal 1011 of an OR gate 1010, whereas if $f^9$ is "1" indicating a negative value, an AND gate 1009 is enabled to supply the content of said shift register 1006 to the output terminal 1011 after inversion. In this manner the absolute value is obtained, and 14-bit data corresponding to $|b4-a1|$ are supplied in the order of $f_0^1$ (least significant bit) - $f_0^{14}$ (most significant bit). The above-described conversion from 8 bits into 14 bits is effected to meet the capacity of 14-bit shift registers 461-466 in an adder unit to be explained later, and the ninth to fourteenth bits $f_0^9$-$f_0^{14}$ are all zero. Blocks 422-424 are constructed in the same manner as the block 421.

Switches S21-S24 and S31-S34 shown in FIG. 18 are now composed of AND gates (see FIG. 19). Thus, for effecting calculations for an odd value of K, a signal "1" is supplied to a signal line 480, whereby signals I-IV are obtained at the output terminals of OR gates OR1-OR4. Also for effecting calculations for an even value of K, a signal "0" is supplied to said signal line 480, whereby signals i-iv are obtained from said OR gates.

Figure 24:
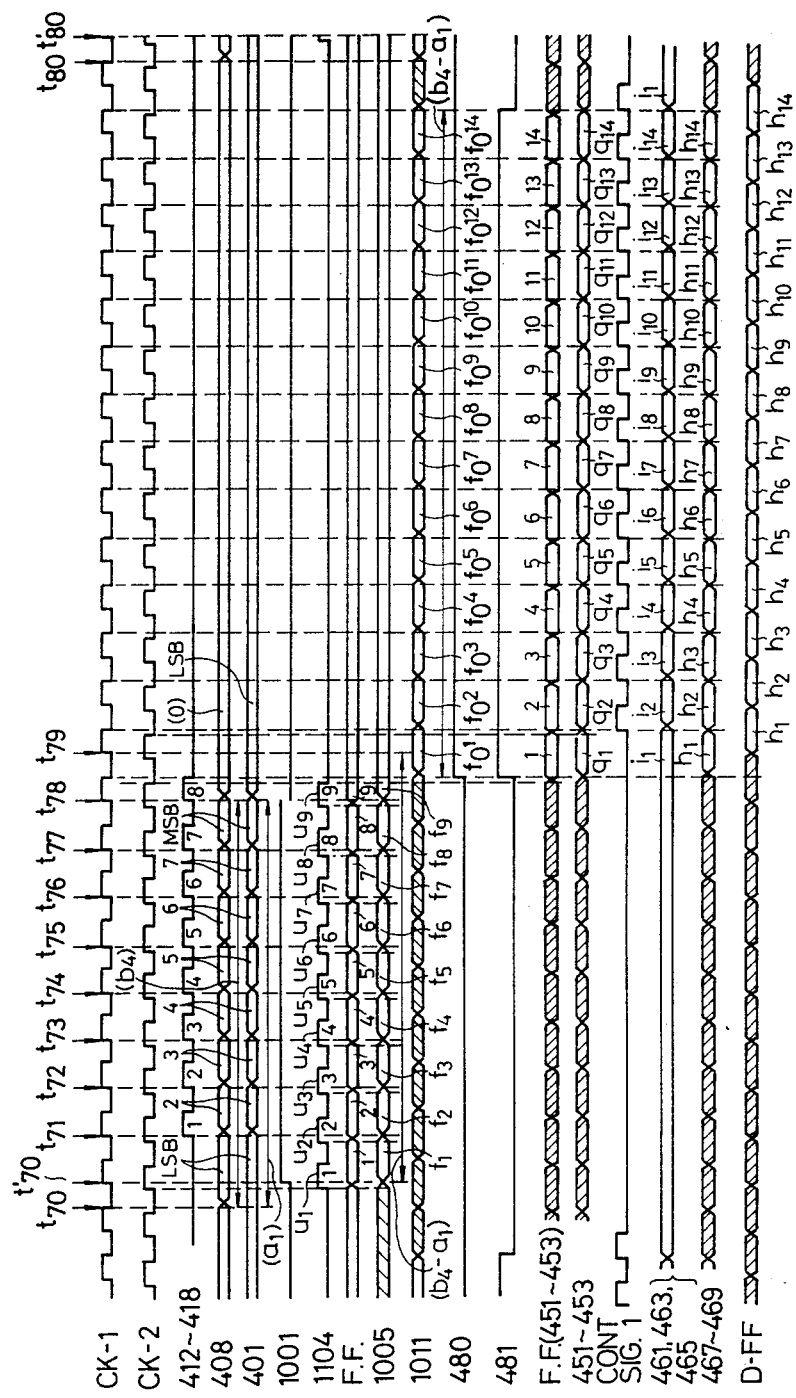
FIG. 24 is a timing chart showing the function in the initial state of the apparatus shown in FIG. 19.

Differential operating units 451, 452, 453 are composed of adders. In each adder, an AND gate receives an inverted input signal to effect a subtracting calculation. Said AND gates are enabled during the passage of the result $f_0^1$-$f_0^{14}$ representing the aforementioned absolute value, by a signal as shown in FIG. 24 supplied through a signal line 481. Except such period all the input signals to the adders are "0", and the carry-over flip-flops in the adders continuously reset the carry-over bits at the fall of the clock pulse CK-2, so that said carry-over bits are "0" when the least significant bit is entered. Consequently, in response to the passage of the data $f_0^1$-$f_0^{14}$, signals $q^1$-$q^{14}$ representing the result of subtracting calculation are obtained from the adders 451-453.

An adding unit 46 is principally composed of adders 467-469 and 14-bit shift registers 461-466 for storing the results of calculations. In said shift registers 461-466 there become stored the values of D(J) corresponding to J=1-6 shown in FIG. 17B with the progress of calculations for K=1-40. In calculations for an odd value of K, an AND gate in each of gate circuits G1-G3 is enabled by a signal supplied through the signal line 480. In this state signals representing the least significant bits of the shift registers 461, 463, 465 are supplied, through OR gates of the gate circuits G1-G3, to AND gates in the adders 467-469. As said AND gates are controlled by a signal supplied through the signal line 481, the input signals to the adders 467-469 are all "0" except a period of passage of the signals $q^1$-$q^{14}$ shown in FIG. 24, whereby the output signals of the carry-over flip-flops in the adders 467, 468, 469 are set to "0" at the start of calculations for the least significant bits. The adder 467 receives the output signals $q^1$-$q^{14}$ from the adder 451 through the AND gate, and the output signals from the shift register 461 performing the signal transfer in response to a signal SIG1 from the sequence control unit as shown in FIG. 24 are also supplied, at timings $i^1$-$i^{14}$, to said adder 467 through the AND gate. For an odd value of K, shift registers 461, 463, 465 alone perform signal transfer, and the results of calculations are outputted, as signals $h^1$-$h^{14}$, from the adder 467. The output signals of the adders 467, 468, 469 are obtained from D-type flip-flops as the output signals Q thereof after a delay of ½ of clock interval.

In the present example, AND gates AND1-AND6 constitute the switches S41-S43, S51-S53 shown in FIG. 18. In calculations for an odd value of K, the gates AND1, AND3, AND5 are enabled by a signal from the sequence control unit whereby the output signals from the D-type flip-flops are stored, sequentially from the least significant bits, in the shift registers 461, 463, 465.

In calculations for an even value of K, the gates AND2, AND4, AND6 are enabled in the same manner to store the results in the shift registers 462, 464, 466. In this manner the registers 461-466 store the values of D(J) respectively corresponding to J=1-6 shown in FIG. 17B when the calculations for the stages K=1-40 are completed.

The detecting unit 47 shown in FIG. 18 is composed of a circuit 473 for discriminating the crossing point with zero level and an operating circuit 475.

Figure 23:
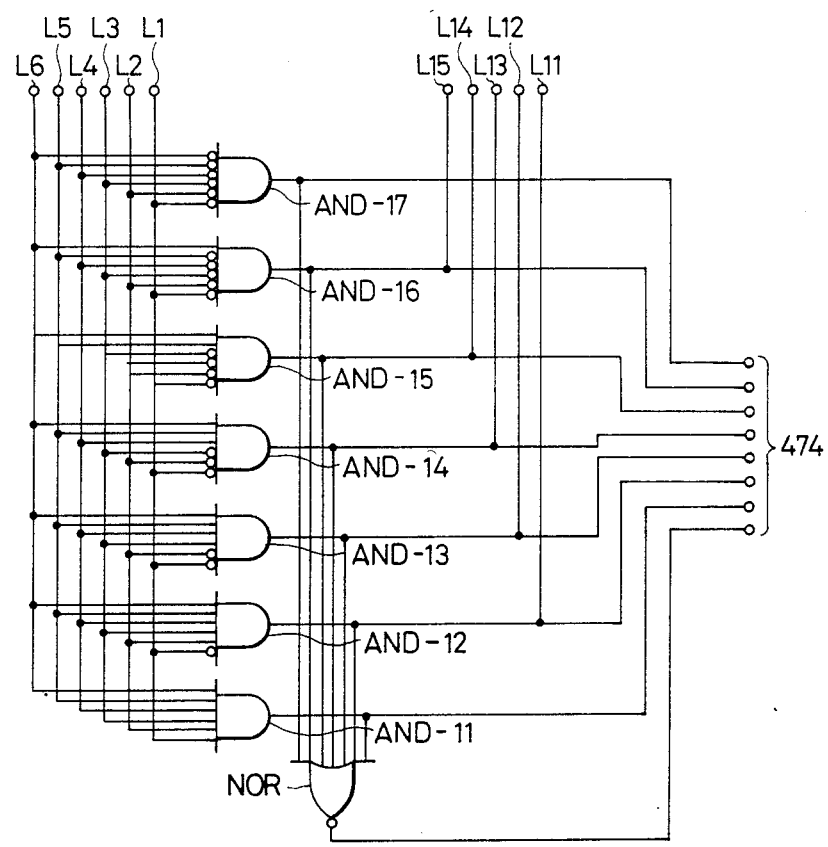
FIG. 23 is a circuit diagram showing the structure of a discriminating circuit shown in FIG. 19.
Figures 25, 27:
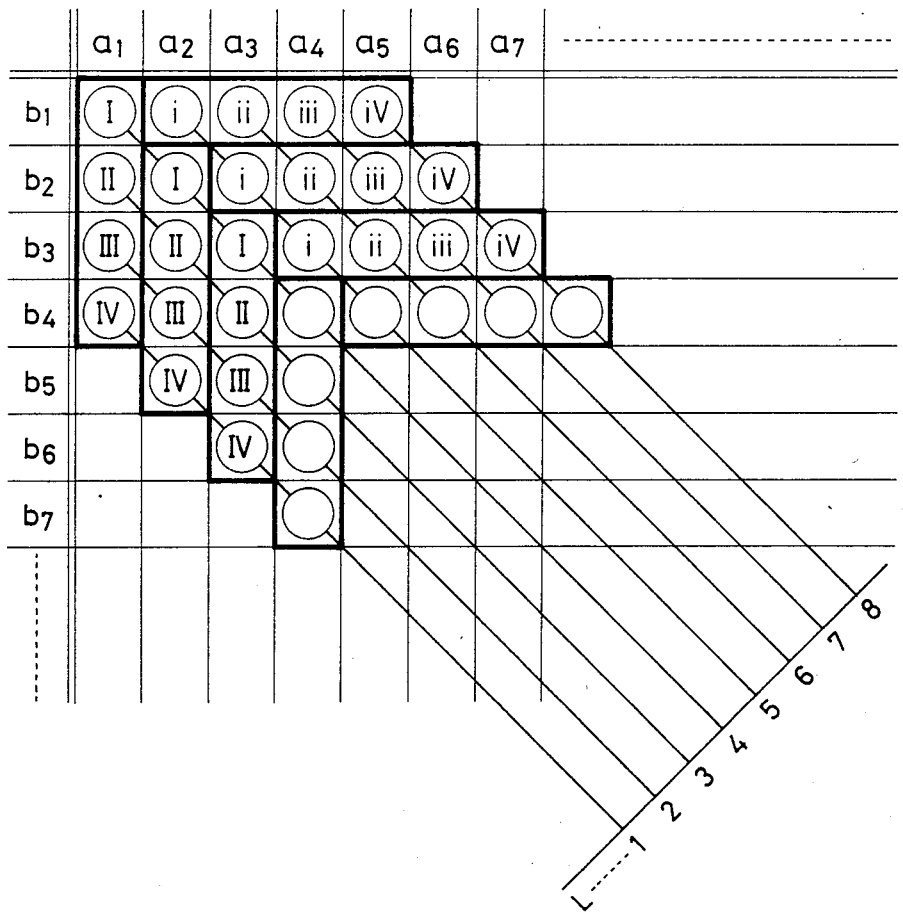
FIG. 25 is a chart showing the output signals of the circuit shown in FIG. 23.
FIG. 27 is a view showing the principle of the variation shown in FIG. 26.

FIG. 23 shows the structure of the discriminating circuit 473. At the completion of calculations for the stages of K=1-40, the 14th most significant bits of the shift registers 461-466 respectively represent the signs of D(J) for J=1-6 shown in FIG. 17B, and said signs are supplied, through signal lines L1-L6, to the discriminating circuit 473 and are subjected to the decoding of bit patterns, as shown in FIG. 25, by AND gates AND-11-AND17 and a NOR gate. A state with all "0" code bits indicates a front focused state, while a state with all "1" code bits indicates a rear focused state, and other intermediate states correspond to different focus positions. As an example, the state shown in FIG. 17B corresponds to a state $J^i=4$, indicating that the crossing point with zero level is positioned between J=4 and J=5. The discrimination of the front- or rear-focused state may be effected in less strict conditions than shown in FIG. 25. For example the front-focused state may be identified when the code bits for J=3, 4, 5 and 6 are all "0", and the rear-focused state may be identified when the code bits for J=1, 2, 3 and 4 are all "1". In any case, any other bit pattern not matching the above-mentioned conditions is regarded as information without correlation, namely with unidentified focus position.

In the circuit shown in FIG. 23, the front-focused state is represented by all "0" input signals which generate a signal "1" from the gate AND 17 only. A bit pattern corresponding to $J^i=4$ generates a signal "1" from the gate AND 15 only. Also in a state without correlation, all AND gates provide signals "0" so that the NOR gate alone provides a signal "1". Consequently the discrimination can be achieved by detecting the position of the signal "1" in the lines 474. In case the signal "1" is outputted from either one of the gates AND12-AND17, said signal is transmitted through lines L11-L15 to the AND gate group shown in FIG. 19. As an example, in a case shown in FIG. 17B, the line L14 alone transmits the signal "1" to enable the corresponding AND gates AND24, AND34. Subsequently the content of the shift register 464, corresponding to the state J=4, is transmitted through the AND gate AND24 and the OR gate OR11 to a register A (not shown) in the operating circuit 475, while the content of the shift register 465, corresponding to the state J=5, is transmitted through the gates AND34 and OR12 to a register B (not shown) in said operating circuit 475. The operating circuit 475 calculates the fraction x ($0 \leq x \leq 1$), which is equal to 0.2 in the example shown in FIG. 17B, from the following equation:

$$x = \frac{\text{(content of register A)}}{\text{(content of register A)} - \text{(content of register B)}}$$

Said circuit 475 further adds said x to $J^i$ obtained through the line 474 to calculate $J = J^i + x$, which is equal to 4.2 in the example shown in FIG. 17B and outputs the obtained result from an output terminal 476. This value J represents the amount of data shift providing the strongest correlation, and, it is therefore possible to discriminate the front- or rear-focused state and to determine an exact amount of defocus in the neighborhood of the focus point, from said value J.

In the above-described second embodiment, the objects of the present invention can be achieved as long as there is provided at least a correlation calculating circuit instead of four circuits 421–424.

In such case an m-th transfer stage, counted from the last in the order of data transfer through plural transfer stages 411–418 and determined for each apparatus, is selected as reference, and the output signals from the [m−i]th stage and from the [m+i+1]th stage are supplied to the correlation calculating circuit, wherein i is zero or a positive integer.

In a more general expression, the objects of the present invention can be achieved if a condition is satisfied that the correlation is calculated between the output signals from two transfer stages which are mutually spaced by zero or an even number of transfer stages.

Figure 26:
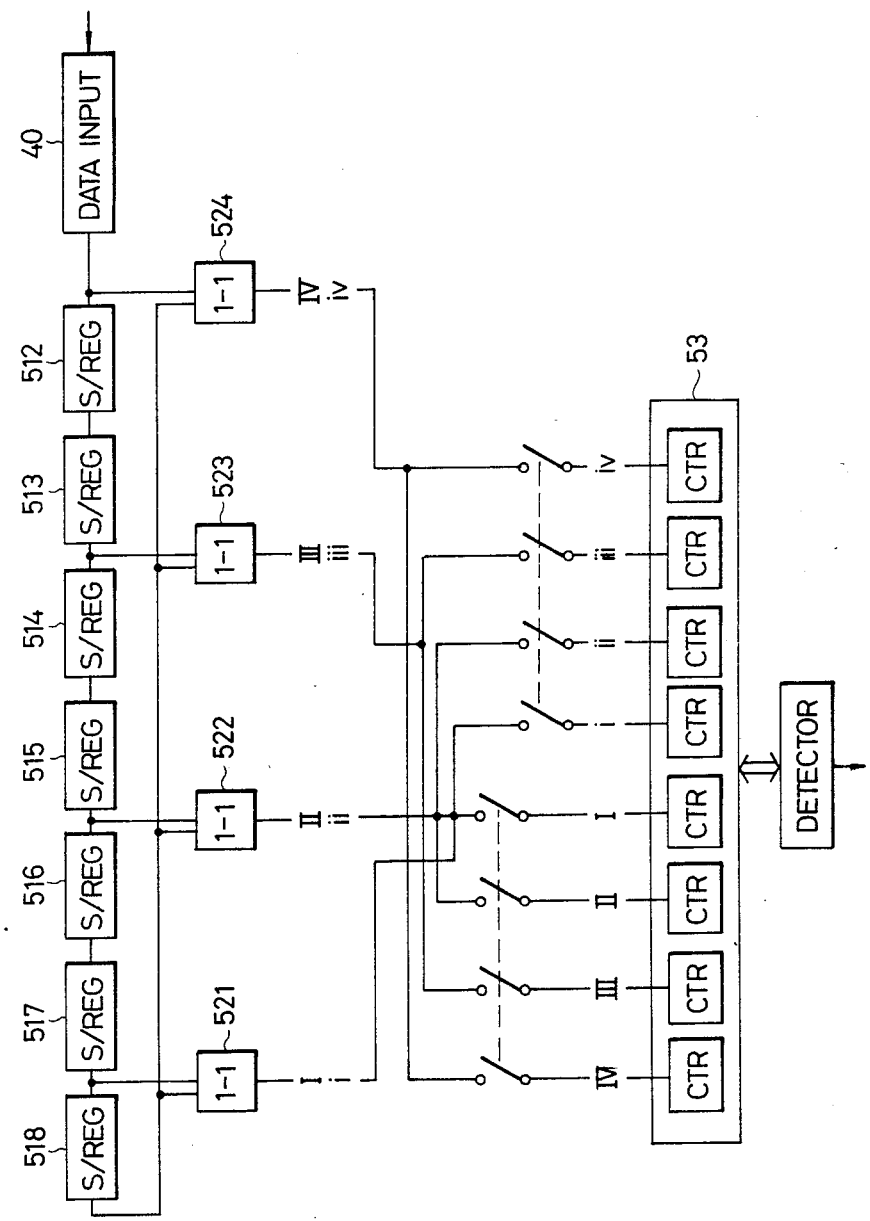
FIG. 26 is a block diagram of another variation of the second embodiment.

FIG. 26 shows a modified example satisfying such condition but not designed to calculate the correlation between the output signals of the [m−i]th and [m+i+1]th transfer stages.

In this example, data a1, b1, a2, b2, . . . from a data input unit 40 are transferred in succession through shift registers 512–518, and correlation calculating circuits 521–524 respectively calculate the correlations between the output signal of the shift register 518 on the one part and the output signals of the shift registers 517, 515, 513 and of the input unit 40 on the other. Thus, when the data a1 is placed in the shift register 518, said correlation calculating circuits 521–524 respectively provide results I-IV, indicating the correlations between a1 and b1-b4 as shown in FIG. 27, to the counters in an adding unit 53 through a switch group. Then, after succeeding advancement of data by one stage, the correlation calculating circuits provide the correlations i-iv between b1 and a2-a5 to the counters of the adding unit 53 through the switch group.

In the following there will be explained a third embodiment of the present invention, comprising photoelectric converting means so constructed as to start the transfer of a data set b ($b_1, b_2, \ldots, b_M$) after the transfer of a data set a ($a_1, a_2, \ldots, a_N$) is completed.

Figure 28:
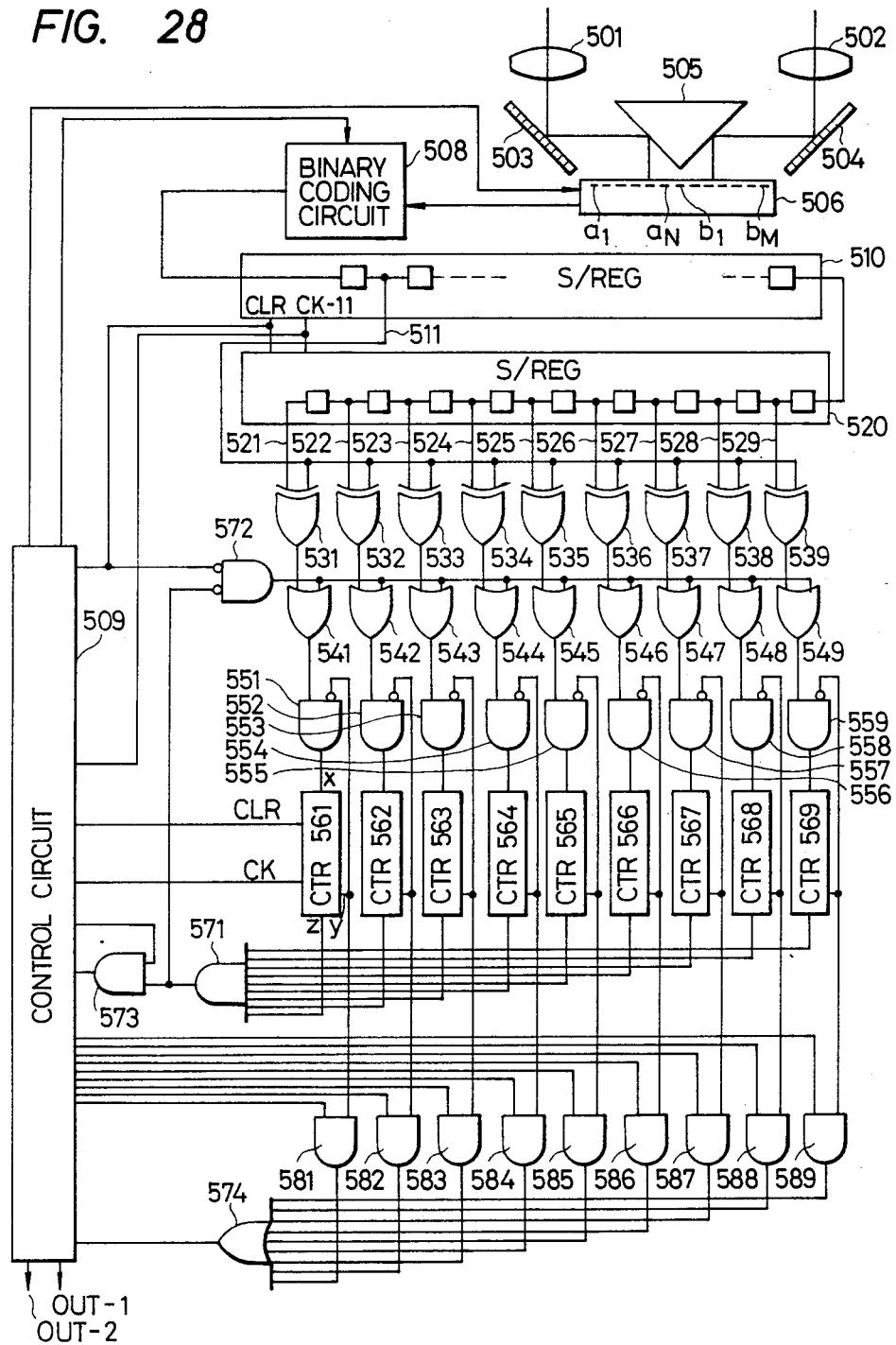
FIG. 28 is a circuit diagram showing a third embodiment of the present invention.

In the apparatus shown in FIG. 28, there is provided a known optical system for forming images of substantially the same portion of an object on a photoelectric converting array 506 through imaging lenses 501, 502 and fixed mirrors 503, 504, 505. Said array 506 is positioned on the focal plane or in the vicinity thereof of said lenses 501, 502. In response to control signals from a control circuit 509, said array 506 converts image data $a_1-a_N$ in an area for comparison and image data $b_1-b_M$ (M>N) in a reference area into electric signals, thus generating data sets $a_1-a_N$ and $b_1-b_M$. Said data are converted, by a binary encoding circuit 508, into 1-bit binary signals and stored in shift registers 510, 520. More specifically, at first N-bit binary signals representing $a_1-a_N$ are sequentially supplied to said shift registers 510, 520, and, after an appropriate interval to be determined from the array structure and other factors, M-bit binary signals representing $b_1-b_M$ are supplied to said shift registers 510, 520. The shift register 510 is provided with transfer stages of M bits, and with an output terminal 511 at the first stage. The succeeding shift register 520 is provided with transfer stages of L bits (L=N−M+1)(L being selected as 9 in the illustration for the purpose of simplicity) and with output terminals 521–529 in respective stages. The signal transfer in the shift registers 510, 520 is controlled by clock signals CK11 supplied from the control circuit 509. The shift registers 510, 520 perform the signal transfer during the reception of data $a_1-a_N$ but then become inactive until the transfer of data $b_1-b_M$ is started, and, in this state, the binary signal of the first data $a_1$ is stored in a stage immediately preceding the last stage of the shift register 520. After said inactive period the signal $b_1$ is at first introduced into the first stage of the shift register 510, whereby the output terminal 521 of the last stage of the register 520 provides a signal $a_1$ while the output terminal 511 of the first stage of the register provides a signal $b_1$. The calculation of correlations is initiated at this point, and exclusive OR gates 531–539 for calculating correlations simultaneously provide exclusive logic sums respectively between $b_1$ and $a_1-a_L$, corresponding to the stage K=1 in FIG. 29. The obtained results are stored in counters 561–569. With the progress of signal transfer in the shift registers 510, 520, the terminal 511 provides a signal for $b_j$ while the terminals 521–529 provide signals $a_j-a_{L+j-1}$. The results of calculations of correlations obtained from the exclusive OR gates 531–539 at each step of signal transfer are added to the counters 561–569. The calculations of correlations for the stages of K=1-8 are completed when the terminal 511 provides a signal for $b_M$ and the terminals 521–529 provide signals for $a_M-a_N$. Each exclusive OR gate provides a signal "1" in response to input signals $a_i=1$, $b_j=0$ or $a_i=0$, $b_j=1$, and a signal "0" in other cases.

Figure 30:
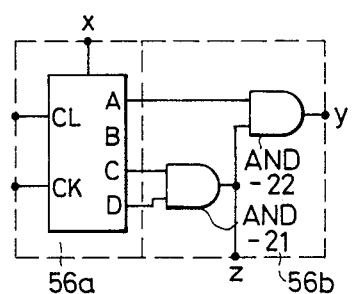
FIG. 30 is a circuit diagram showing a counter decoder.

In this manner each counter counts the number of cases of absence of correlation. Since the reference viewing field is extended to M elements in the array, each counter has to count up to M bits in case no correlation is found. However what is practically needed is the position of strongest correlation. In case the count q ($0 \leq q \leq M$) exceeds a determined number $q_s$, for example $q_s=10$, the data $a_1-a_N$ and $b_1-b_M$ are considered not suitable for exact range finding, so that it is more appropriate in such case to generate a signal indicating that the range finding is impossible and to proceed to the accumulation of succeeding image data. From such standpoint it is possible to reduce the capacity of the counters by fixing any count exceeding $q_s$ at $q_s+1$. FIG. 30 shows a counter-decoder provided with such function.

Figures 31, 33:
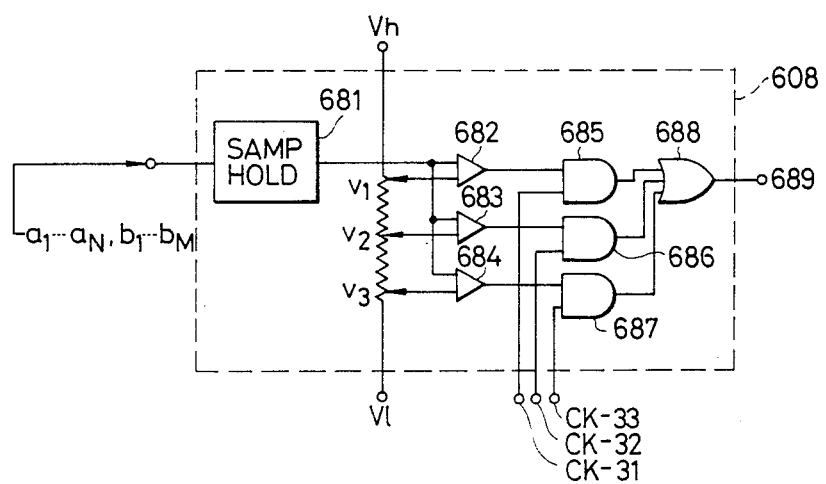
FIG. 31 is a chart showing the value in each bit of the counter.
FIG. 33 is a circuit diagram showing the structure of a binary coding circuit.

The counter shown in FIG. 30 is provided with the aforementioned constant $q_s=12$, and is composed of a 4-bit counter 56a and a decoding circuit 56b. As the count increases to 12, terminals C, D output signals "1" as shown in FIG. 31 to shift the output signal z of an AND gate AND21 from "0" to "1". With a further increase in the count a terminal A also provides a signal "1" to shift the output signal y of an AND gate AND22 from "0" to "1". At the start of counting, all the counter-decoders provide output signals y=0, z=0, so that an AND gate 571 provides a "0" output signal indicating the logic sum of the output signals z of the counters 561–569. However control circuit 509 causes an AND gate 572 to maintain an output signal "0" during the transfer of the data $b_1-b_M$, whereby OR gates 541–549 transmit the output signals of exclusive OR gates 531–539. From the start of counting operation of the counter-decoders 561–569 up to 12 counts (=$q_s$), the output signals y remain at "0" whereby AND gates 551–559 transmit the output signals of the OR gates 541–549, thus advancing the counting operation of the counter-decoders. When either one of the counters reaches 13 counts ($=q_s+1$), the corresponding output signal y is shifted to "1" to disable a corresponding AND gate among the gates 551–559 whereby the count of said counter is thereafter fixed at 13 ($=q_s+1$). In this manner the calculation of correlation is effected on new data $b_i$ with the transfer of data in the shift registers 510, 520, and the number of output signals $y=1$ from the counter-decoders increases with the advancement of counting of the cases of no correlation. Such counters outputting the signal $y=1$ are fixed at $q=13$ ($q_s+1$). In case all the counter-decoders provide output signals $z=1$ at the end of counting operation, the AND gate 571 provides an output signal "1". An AND gate 573 which is enabled at the end of one data transfer transmits such state to the control circuit 509. In such case said control circuit 509 terminates the calculation of correlations at this point, generates a signal OUT1 indicating that the correlation is not detectable and causes the photoelectric converting array to re-start the charge accumulation for obtaining new sets of data $a_1-a_N$ and $b_1-b_M$.

In general, at the moment of enabling, the AND gate 573 provides an output signal "0", whereby the control circuit 509 resets the shift registers 510, 520 to prepare for the next data transfer. Simultaneously the output signal of the AND gate 572 is shifted from "0" to "1" whereby all the OR gates 541–549 provide output signals "1". Consequently, among the AND gates 551–559, those not yet disabled at this point maintain output signals "1", whereby the counter-decoders continue counting operation by the clock signals which continue to be supplied from the control circuit 509. In this manner the counters of which counts q have been smaller than 12 (or generally $q_s$) eventually reach a state $q=12$ to output a signal $z=1$, and, in response to a succeeding clock pulse, reach a state $q=13$ to output a signal $y=1$, whereby the corresponding input AND gates are disabled to fix the state $q=q_s+1$. Thus, when a counter of the least count reaches a count $q=12$, all the output signals z assume the state "1", whereby the output signal of the AND gate 571 is shifted from "0" to "1" and that of the AND gate 572 is shifted to "0". Since the shift registers 510, 520 are already cleared, the output signals of the exclusive OR gates 541–549 are maintained at "0". Consequently said counter with the least count maintains a count $q=12$. In this state the counter-decoder with the least count alone outputs a signal $y=0$ while all other counter-decoders output a signals $y=1$. Thus the position of the signal $y=0$ corresponds to the amount of displacement providing the strongest correlation, and therefore to the distance to the object. Said position can be detected by sequentially enabling the AND gates 581–589 and counting the number of pulses until the output signal of an OR gate 574 shows a change. Said counted pulses constitute a signal related to the distance to the object, and are supplied from the control circuit 509 to the exterior through a line OUT2 for use in a display of distance or in a lens driving motor.

The correlation between two sets of data $a_1-a_N$ and $b_1-b_M$, if calculated by exclusive OR operation between simply binaryized data $a_1'-a_N'$ and $b_1'-b_M'$ as explained in the embodiment of FIG. 28, is represented by the following equation:

$$C(L) = \sum_{j=1}^{M} (b_j' \oplus a'_{L+j-1})$$

wherein $\oplus$ represents the exclusive OR operation, and $\Sigma$ does not means the Boolean arithmetic addition but the ordinary addition. Consequently, in such case, $C(L)=0$ if the data $b_1'-b_M'$ are completely correlated with the data $a_L'-a'_{L+M-1}$, and $C(L)=M$ in the complete absence of correlation. In such calculation, however, the error in determining the exact position of correlation $L_p$ increases if the number M of data to be added is in the order of 20 or even less. A following embodiment avoids such difficulty by using plural slicing levels in binary encoding. Again referring to the case of FIG. 28, the correlation $C(L)$ between $b_1-b_M$ and $a_L-a_{L+M-1}$ is determined by the following equation:

$$C(L) = \sum_{j=1}^{M} \left( \sum_{r=1}^{R} b_{jr} \oplus a_{(L+j-1)r} \right)$$

wherein the data $a_i$, $b_j$ are respectively binary encoded with R slicing levels into $a_{i1}, \ldots, a_{ir}, \ldots, a_{iR}, b_{ji}, \ldots, b_{jr}, \ldots, b_{jR}$. The calculation of correlations with data obtained from such plural slicing levels increases the amount of available information and enables the positional detection with an improved accuracy.

Figure 32:
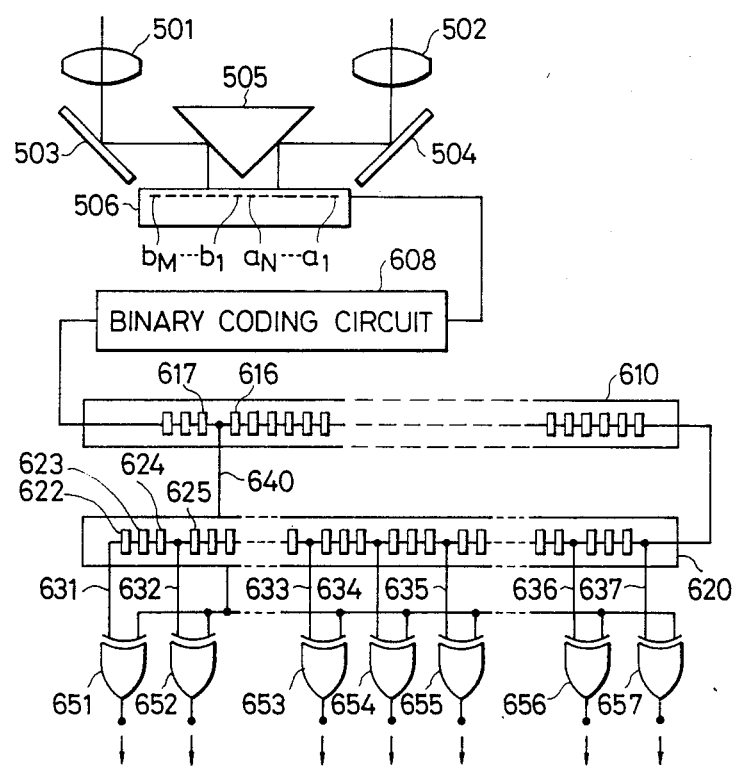
FIG. 32 is a circuit diagram showing a fourth embodiment of the present invention.

FIG. 32 shows an embodiment with three slicing levels for binary encoding ($R=3$), wherein $M \neq N$ as in the case of FIG. 28.

Data sets $a_1-a_N$ and $b_1-b_M$ ($N<M$) obtained from a photoelectric converting array 506 similar to that shown in FIG. 28 are binary encoded with plural slicing levels in a binary encoding circuit 608. Each of the signals time-sequentially supplied to said circuit is retained by a sample-hold circuit 681 shown in FIG. 33 until the entry of a succeeding signal. Said retained voltage is compared, respectively in comparators 682, 683, 684, with three reference voltages v1, v2, v3 prepared from voltages $v_h$ and $v_l$ determined previously or according to the image contrast, and three binary signals from said comparators are supplied to AND gates 685, 686, 687, which sequentially transmit said signals through an OR gate 688 in response to pulses CK31–CK33 dividing the sample-hold period into three sections.

In this manner three binary signals are transmitted to shift registers 610, 620 in response to single image data, for example $a_1$. An element 622 in said shift registers 610, 620 represents a 1-bit transfer stage. The shift register 620 is provided with transfer stages of a number $(N-M) \times R$ (R being equal to 3 in this example) and with output terminals 631–637 of a number $(N-M+1)$ at every R transfer stages. Also the shift register 610 is provided with transfer stages of a number at least equal to $M \times R+1$ ($M \times R+3$ in the illustrated example) and with an output terminal 640 at the $(M=R+1)$th transfer stage. Said output terminals are connected to exclusive OR gates 651–657 for conducting exclusive OR calculations between the signal from the terminal 640 and each signal from the terminals 631–637.

Figure 29:
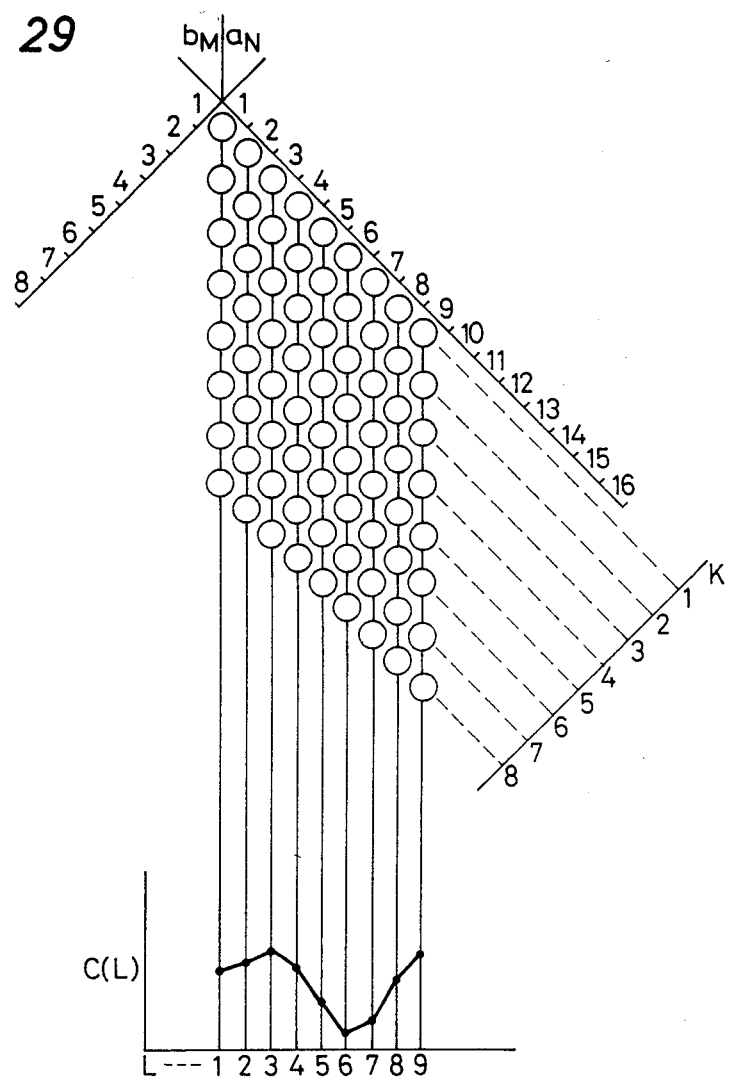
FIG. 29 is a view showing the principle of the third embodiment.

When the signals $a_{11}, a_{12}, a_{13}, a_{21}, \ldots, a_{N3}$ and $b_{11}$ are respectively transferred to the transfer stages 622, 623, 624, 625, . . . , 616 and 617 in the course of successive transfer of binary signals obtained with three slicing levels, the output signals of the exclusive OR gates 651–657 indicate the correlations with respect to the first slicing level, for the stage $K=1$ in FIG. 29. Then, when the signals $a_{12}, a_{13}, a_{21}, \ldots, b_{11}$ and $b_{12}$ are respectively transferred to the transfer stages 622, 623, 624, 625, . . . , 616 and 617 by a step advancement, the output signals of said exclusive OR gates represent the correlations with respect to the second slicing level, for the stage K=1 in FIG. 29. Furthermore, when the signals $a_{13}$, $a_{21}$, $a_{22}$, $a_{23}$, . . . , $b_{12}$ and $b_{13}$ are respectively transferred to the transfer stages by a step advancement, the output signals of said exclusive OR gates represent the correlations with respect to the third slicing level, for the stage K=1. The correlation values given by the exclusive OR gates in the positions L=1 to (N−M+1) with the progress of signal transfer are summed up in the same manner as shown in FIG. 28.

Figure 34:
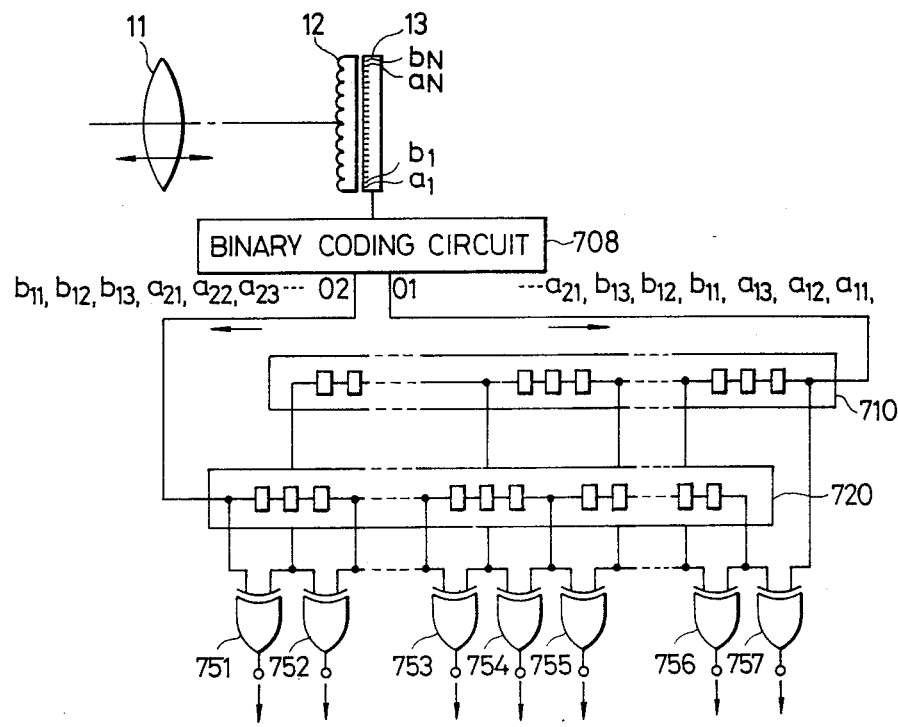
FIG. 34 is a circuit diagram showing a fifth embodiment of the present invention.
Figure 35:
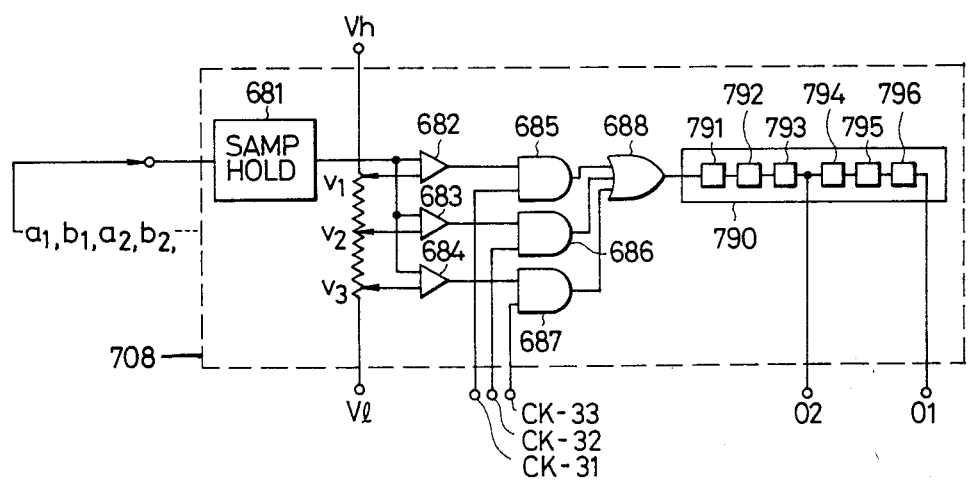
FIG. 35 is a circuit diagram showing the structure of a binary coding circuit.
Figure 36:
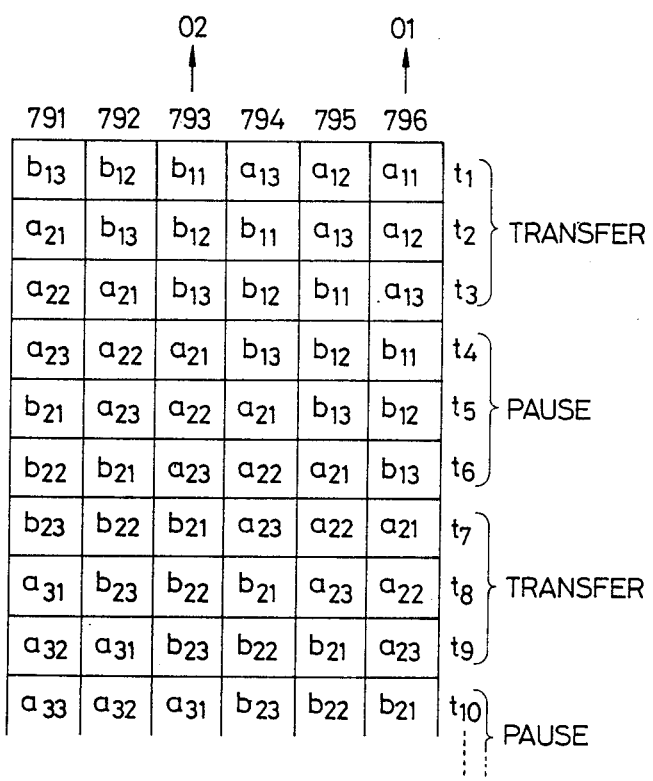
FIG. 36 is a chart showing the state of data transfer in the circuit shown in FIG. 35.

FIG. 34 shows another embodiment in which M=N as in the case of FIG. 1A. Data $a_1$, $b_1$, $a_2$, $b_2$, . . . , $a_N$, $b_N$ time-sequentially obtained from an optical system similar to that shown in FIG. 2 are binary encoded with three slicing levels in a binary encoding circuit 708 and alternately outputted from terminals O1, O2. FIG. 35 shows an example of such binary encoding circuit, wherein the components 681–688 are identical to those shown in FIG. 33. Each signal constituting the sequentially entered data $a_1$, $b_1$, $a_2$, $b_2$, . . . is converted into three binary signals sequentially outputted from an OR gate 688, and transferred in succession through a 6-bit shift register 790. When the first binary signal $a_{11}$ of the first data $a_1$ is transferred to a shift register 796, shift registers 796–791 respectively hold $a_{11}$, $a_{12}$, $a_{13}$, $b_{11}$, $b_{12}$, $b_{13}$ as shown in a line t1 in FIG. 36, so that the output terminals O1, O2 respectively provide the signals representing $a_{11}$ and $b_{11}$. In this manner the output terminals O1, O2 provide $a_{12}$, $b_{12}$ at the next timing $t_2$; $a_{13}$, $b_{13}$ at the timing $t_3$; . . . ; $a_{22}$, $b_{22}$ at the timing $t_8$. Shift registers 710, 720 of mutually opposite directions are activated intermittently to transfer the signals at the timings t1, t2, t3 but to stop the transfer at the timings t4, t5, t6, whereby the shift register 710 transfers the binary signals $a_{11}$, $a_{12}$, $a_{13}$, $a_{21}$, $a_{23}$, . . . while the shift register 720 transfers the binary signals $b_{11}$, $b_{12}$, $b_{13}$, $b_{21}$, $b_{22}$, $b_{23}$, . . . in mutually synchronized timings.

Each of the shift registers 710, 720 is provided with output terminals at every three (=R) transfer stages, and said output terminals are connected to exclusive OR gates 751–757.

I claim:

1. An apparatus for determining correlation between first and second sets of data, wherein said first and second sets are respectively composed of plural data and have a corresponding relationship with each other, comprising:
   (a) shift register means including a plurality of transfer stages to individually receive therein each said data, and transferring the data received in each of said transfer stages in succession to the subsequent transfer stage;
   (b) input means for introducing each of the data in said first and second sets of data into said shift register means alternately relative to said first and second sets of data in synchronization with said transfer; and
   (c) comparison means to mutually compare the data in a selected pair of transfer stages from among said plurality of transfer stages in shift register means, with none or an even number of transfer stages being interposed between them.

2. The apparatus as set forth in claim 1, wherein said comparison means compares the data in the (m−i)-th transfer stage and the data in the (m+i+1)-th transfer stage, counting from one transfer stage out of said plurality of transfer stages which last receives transfer of said data, where m is a constant, and i is an integer of $i \geq 0$.

3. The apparatus as set forth in claim 1, wherein said comparison means generates a comparison output at every said transfer, and said apparatus further comprises a pair of accumulating means for individually and separately accumulating the comparison outputs which have been alternately received.

4. The apparatus as set forth in claim 3, further comprising means for comparing said accumulated values relative to each other.

5. The apparatus as set forth in claim 1, wherein one of the transfer stages of said selected pair is the final transfer stage out of said plurality of transfer stages, which last receives the transfer of said data, and the remaining transfer stage of said selected pair is a transfer stage preceding the final transfer stage.

6. An apparatus for determining correlation between a first set of data consisting of N-number of data and a second set of data consisting of M-number of data, said apparatus comprising:
   (a) shift register means including at least N+1 number of transfer stages to individually receive each of said said data, and transferring the data received in each of said transfer stages in succession to the subsequent stage;
   (b) input means for introducing each of said data in said first set of data into shift register means, and subsequently introducing each of said data in said second set of data into said shift register means; and
   (c) a plurality of comparison means for comparing, at every said transfer, the data in one reference transfer stage out of the transfer stages in said shift register means and each of the data in a plurality of other transfer stages out of those transfer stages, wherein at least M−1 number of transfer stages are disposed between each of said other transfer stages and said reference transfer stage.

7. The apparatus as set forth in claim 6, further comprising a plurality of counter means connected with each of said plurality of comparison means.

8. The apparatus as set forth in claim 7, further comprising means for comparing the contents of said plurality of counter means.

9. The apparatus as set forth in claim 6, wherein the data number N in said first set of data and the data number M in said second set of data hava a relationship of N≠M, and said plurality of comparison means compare each of the data in a plurality of transfer stages out of those transfer stages between the M-th and N-th order counting from said reference transfer stage with data in said reference transfer stage.

10. The apparatus as set forth in claim 9, wherein said data number N and said data number M have a relationship of N>M, and said each data is transferred, after its passage through said reference transfer stage, into each of a plurality of transfer stages which have received and stored therein the data to be compared by said comparison means.

11. In a range finding apparatus of a construction comprising an array made up of a plurality of photoelectric converting elements disposed on or in the vicinity of an optical image forming plane of first and second light beams which are emitted from one and the same object and have passed through spatially different regions, wherein the array is so arranged that relative positions on said array of an optical image formed by said first light beam and an optical image formed by said second light beam vary in response to variations in a distance from said object, and wherein first and second sets of data, each being composed of a plurality of data, are produced from said photoelectric converting elements with respect to said first and second light beams, an apparatus for determining correlation between said first and second sets of data comprising:

(a) shift register means including a plurality of transfer stages to individually receive therein each said data, and transferring the data received in each of said transfer stages in succession to the subsequent transfer stage;

(b) input means for introducing each of the data in said first and second sets of data into said shift register means alternately relative to said first and second sets of data in synchronization with said transfer; and (c) comparison means to mutually compare the data in a selected pair of transfer stages from among said plurality of transfer stages in said shift register means, with none or an even number of transfer stages being interposed between them.

12. In a range finding apparatus of a construction comprising an array made up of a plurality of photoelectric converting elements disposed on or in the vicinity of an optical image forming plane of first and second light beams which are emitted from one and the same object and have passed through spatially different regions, wherein the array is so arranged that relative positions on said array of an optical image formed by said first light beam and an optical image formed by said second light beam vary in response to variations in a distance from said object, and wherein a first set of data composed on N-number of data relative to said first light beam and a second set of data composed of M-number of data relative to said second light beam are produced from said photoelectric converting elements, an apparatus for determining correlation between said first and second sets of data comprising:

(a) shift register means including at least N+1 number of transfer stages to individually receive each of said data, and transferring the data received in each of said transfer stages in succession to the subsequent stage;

(b) input means for introducing each of said data in said first set of data into said shift register means, and subsequently introducing each of said data in said second set of data into said shift register means; and (c) a plurality of comparison means for comparing, at every said transfer, the data in one reference transfer stage out of the transfer stages in said shift register means and each of the data in a plurality of other transfer stages out of those transfer stages, wherein at least M−1 number of transfer stages are disposed between each of said other transfer stages and said reference transfer stage.

* * * * *